(12) United States Patent
Takeda et al.

(10) Patent No.: US 9,832,764 B2
(45) Date of Patent: Nov. 28, 2017

(54) RADIO BASE STATION, USER TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Qin Mu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/431,329

(22) PCT Filed: Jul. 31, 2013

(86) PCT No.: PCT/JP2013/070785
§ 371 (c)(1),
(2) Date: Mar. 26, 2015

(87) PCT Pub. No.: WO2014/050302
PCT Pub. Date: Apr. 3, 2014

(65) Prior Publication Data
US 2015/0282129 A1    Oct. 1, 2015

(30) Foreign Application Priority Data

Sep. 28, 2012  (JP) .................................. 2012-216731
Nov. 2, 2012   (JP) .................................. 2012-243093
Nov. 21, 2012  (JP) .................................. 2012-255503

(51) Int. Cl.
*H04W 4/00*       (2009.01)
*H04B 7/208*      (2006.01)
(Continued)

(52) U.S. Cl.
CPC ........ *H04W 72/042* (2013.01); *H04B 7/0452* (2013.01); *H04L 1/0046* (2013.01);
(Continued)

(58) Field of Classification Search
CPC .. H04W 72/042; H04B 7/0452; H04L 1/0046; H04L 1/0072; H04L 27/2643
See application file for complete search history.

(56) References Cited

U.S. PATENT DOCUMENTS

2012/0320846 A1*  12/2012  Papasakellariou .. H04W 72/042
                                                              370/329
2013/0044692 A1*  2/2013   Nory ................... H04L 25/0228
                                                              370/329
(Continued)

FOREIGN PATENT DOCUMENTS

EP    2838215 A1    2/2015

OTHER PUBLICATIONS

Office Action issued in the counterpart Japanese patent application No. JP2012-255503, dated Mar. 24, 2015 (5 pages).
(Continued)

*Primary Examiner* — Lonnie Sweet
(74) *Attorney, Agent, or Firm* — Osha Liang LLP

(57) ABSTRACT

The present invention is designed to make it possible to adequately form the search space candidates to be used in the blind decoding of downlink control information when the radio resource region for downlink control channels is expanded. The radio base station of the present invention is a radio base station that transmits downlink control information for a user terminal by using an enhanced downlink control channel that is frequency-division-multiplexed with a downlink shared data channel, and has a configuring section that configures, for the user terminal, a plurality of resource sets that are each formed by including a plurality of resource blocks allocated to the enhanced downlink control channel, and a determining section that determines enhanced control channel elements to constitute a plurality of search space candidates such that the plurality of search space
(Continued)

candidates of each resource set are all placed in different resource blocks.

10 Claims, 18 Drawing Sheets

(51) Int. Cl.

| | | |
|---|---|---|
| *H04B 7/212* | (2006.01) | |
| *H04W 72/04* | (2009.01) | |
| *H04L 1/00* | (2006.01) | |
| *H04B 7/0452* | (2017.01) | |
| *H04L 27/26* | (2006.01) | |
| *H04L 5/00* | (2006.01) | |
| *H04W 88/02* | (2009.01) | |
| *H04W 88/08* | (2009.01) | |

(52) U.S. Cl.
CPC ........ *H04L 5/0053* (2013.01); *H04L 27/2643* (2013.01); *H04W 88/02* (2013.01); *H04W 88/08* (2013.01)

(56) References Cited

U.S. PATENT DOCUMENTS

| | | | | |
|---|---|---|---|---|
| 2013/0064216 A1* | 3/2013 | Gao | ................. | H04L 5/0016 370/330 |
| 2013/0195020 A1* | 8/2013 | Frederiksen | ........ | H04W 72/042 370/329 |
| 2013/0242882 A1* | 9/2013 | Blankenship | ....... | H04W 72/042 370/329 |
| 2013/0301542 A1* | 11/2013 | Krishnamurthy | ..... | H04W 52/50 370/329 |

OTHER PUBLICATIONS

3GPP TSG-RAN WG1, R1-123944, "WF on ePDCCH search space", Meeting #70, Qingdao, China, Aug. 13-17, 2012 (6 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)," Dec. 2008 (18 pages).
International Search Report issued in PCT/JP2013/070785, dated Oct. 29, 2013 (1 page).
Fujitsu; "Search space configuration for localized ePDCCH"; 3GPP TSG RAN WG1 Meeting #70, R1-123305; Qingdao, China; Aug. 13-17, 2012 (14 pages).
NTT DOCOMO; "Search Space Design for Localized EPDCCH Transmission"; 3GPP TSG RAN WG1 Meeting #71, R1-124842; New Orleans, USA; Nov. 12-16, 2012 (4 pages).
Extended Search Report issued in corresponding European Application No. 13840326.6, dated May 20, 2016 (10 pages).
Office Action issued in the counterpart Chinese Patent Application No. 201380050754.1, dated Jun. 29, 2016 (12 pages).
Office Action issued in the counterpart European Patent Application No. 13840326.6, dated Apr. 12, 2017 (4 pages).

* cited by examiner

RADIO BASE STATION, USER TERMINAL, RADIO COMMUNICATION SYSTEM AND RADIO COMMUNICATION METHOD

TECHNICAL FIELD

The present invention relates to a radio base station, a user terminal, a radio communication system and a radio communication method in a next-generation radio communication system.

BACKGROUND ART

In a UMTS (Universal Mobile Telecommunications System) network, long-term evolution (LTE) is under study for the purpose of achieving even higher data rates, lower delays and so on (non-patent literature 1). In LTE, as multiple access schemes, a scheme that is based on OFDMA (Orthogonal Frequency Division Multiple Access) is used in downlink channels (the downlink), and a scheme that is based on SC-FDMA (Single Carrier Frequency Division Multiple Access) is used in uplink channels (the uplink).

Also, successor systems of LTE (referred to as, for example, "LTE-advanced" or "LTE enhancement" (hereinafter referred to as "LTE-A")) are under study for the purpose of achieving further broadbandization and increased speed beyond LTE. In LTE (Release 8) and LTE-A (Release 9 and later versions), MIMO (Multi-Input Multi-Output) techniques are under study as radio communication techniques to transmit and receive data using a plurality of antennas and improve spectral efficiency. According to MIMO techniques, a plurality of transmitting/receiving antennas are provided in a transmitter/receiver, so that different transmission information sequences are transmitted from different transmitting antennas at the same time.

CITATION LIST

Non-Patent Literature

Non-Patent Literature 1: 3GPP TR25.913 "Requirements for Evolved UTRA and Evolved UTRAN"

SUMMARY OF INVENTION

Technical Problem

In future systems such as LTE-A, multiple-user MIMO (MU-MIMO) transmission to send transmission information sequences from different transmitting antennas to different users simultaneously, is under study. This MU-MIMO transmission is also applied to a HetNet (Heterogeneous Network) and CoMP (Coordinated Multi-Point) transmission. Meanwhile, in this future system, there is a threat that the characteristics of the system such as MU-MIMO transmission cannot be fully optimized due to the shortage of the capacity of downlink control channels to transmit downlink control information.

So, it may be possible to expand the radio resource regions for downlink control channels and transmit more downlink control information. In this case, how to configure the search space candidates (candidates for a search space) to use for the blind decoding of the downlink control information becomes a problem.

The present invention has been made in view of the above, and it is therefore an object of the present invention to provide a radio base station, a user terminal, a radio communication system and a radio communication method that can adequately form the search space candidates to use for the blind decoding of downlink control information when the radio resource regions for downlink control channels are expanded.

Solution to Problem

The radio base station of the present invention is a radio base station that transmits downlink control information for a user terminal by using an enhanced downlink control channel that is frequency-division-multiplexed with a downlink shared data channel, and this radio base station has a configuring section that configures, for the user terminal, a plurality of resource sets that are each formed by including a plurality of resource blocks allocated to the enhanced downlink control channel, and a determining section that determines enhanced control channel elements to constitute the plurality of search space candidates (candidates for a search space) such that the plurality of search space candidates of each resource set are all placed in different resource blocks.

The user terminal of the present invention is a user terminal that receives downlink control information from a radio base station by using an enhanced downlink control channel that is frequency-division-multiplexed with a downlink shared data channel, and this user terminal has a determining section that, when a plurality of resource sets, each formed by including a plurality of resource blocks allocated to the enhanced downlink control channel, are configured for the user terminal, determines enhanced control channel elements to constitute the plurality of search space candidates of each resource set, and an acquiring section that acquires the downlink control information by blind-decoding the enhanced control channel elements, and the plurality of search space candidates are all placed in different resource blocks that constitute each resource set.

Advantageous Effects of Invention

According to the present invention, when the radio resource regions for downlink control channels are expanded, it is possible to adequately form the search space candidates to be used in the blind decoding of downlink control information.

DESCRIPTION OF EMBODIMENTS

Figure 1:
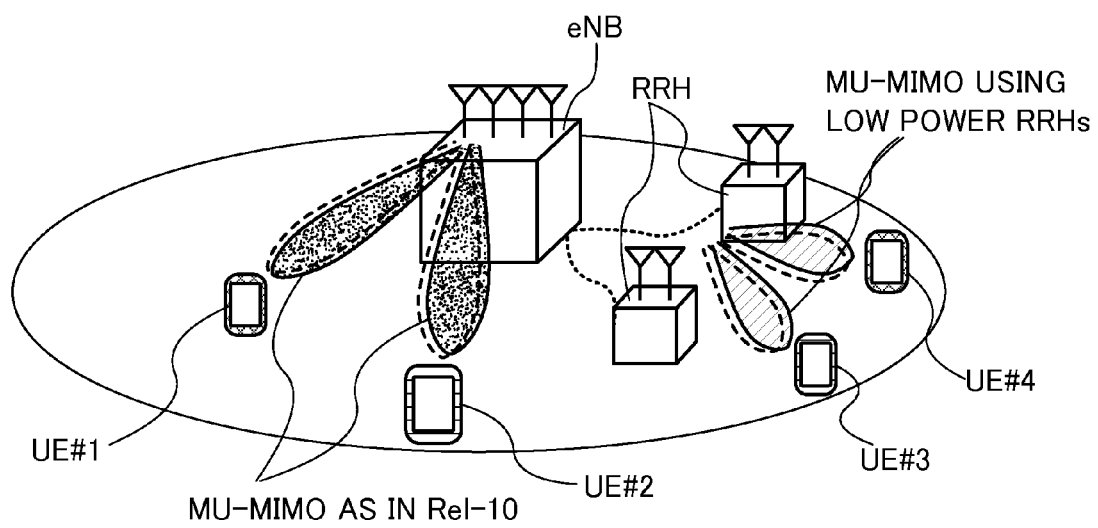
FIG. 1 is a schematic diagram of a radio communication system where MU-MIMO transmission is applied.

FIG. 1 is a diagram to show an example of a radio communication system where MU-MIMO transmission is applied. The system shown in FIG. 1 is structured in layers by providing small base stations (for example, RRHs (Remote Radio Heads)) having local coverage areas within the coverage area of a radio base station (for example, an eNB: eNodeB). In downlink MU-MIMO transmission in this system, data for a plurality of user terminals UE (User Equipment) #1 and UE #2 is transmitted at the same time from a plurality of antennas of the radio base station. Also, data for a plurality of user terminals UE #3 and UE #4 is transmitted at the same time from a plurality of antennas of a plurality of small base stations.

Figure 2:
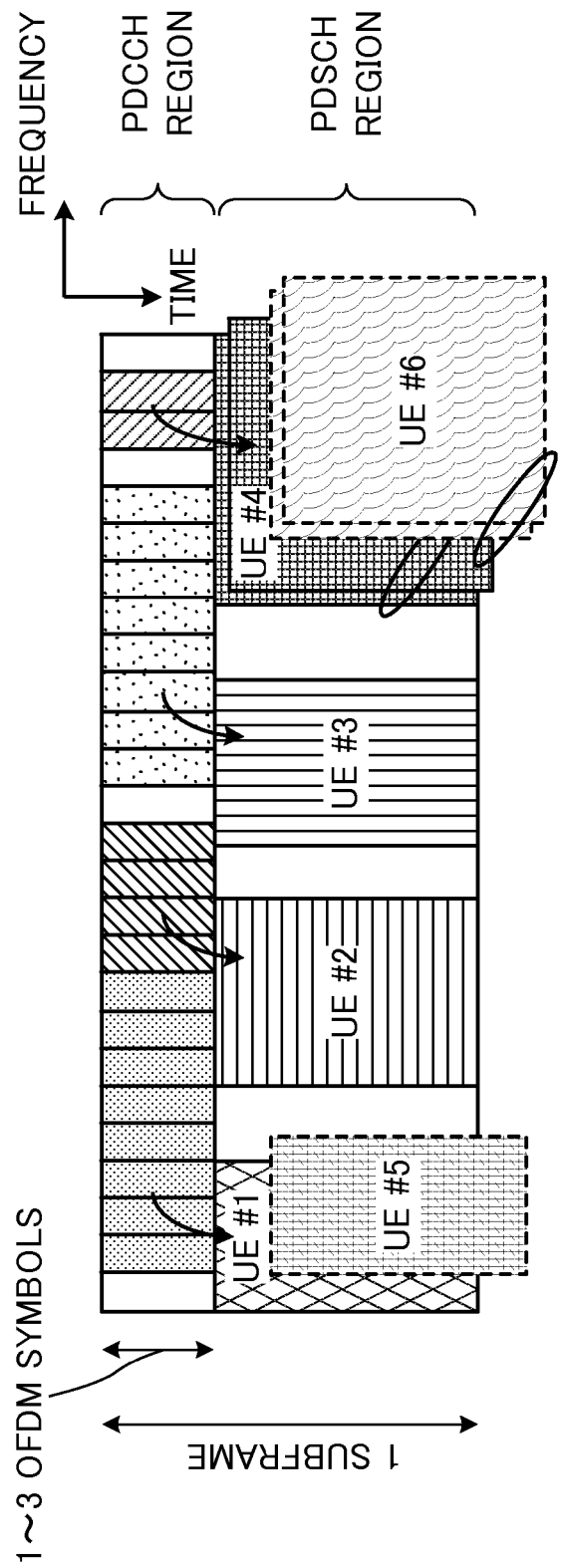
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system where MU-MIMO transmission is applied, a predetermined number of OFDM symbols (maximum three OFDM symbols) from the top of each subframe are secured as a radio resource region (PDCCH region) for a downlink control channel (PDCCH: Physical Downlink Control CHannel). Also, a radio resource region (PDSCH region) for a downlink shared data channel (PDSCH: Physical Downlink Shared CHannel) is secured in radio resources following the predetermined number of symbols from the subframe top.

In the PDCCH region, downlink control information (hereinafter referred to as "DCI") for user terminals UE (here, UE #1 to UE #4) is allocated. The DCI includes allocation information of data for the user terminals UE in the PDSCH region, and/or the like. For example, in FIG. 2, user terminal UE #2 receives the data for user terminal UE #2 that is allocated to the PDSCH region, based on the DCI for user terminal UE #2 that is allocated to the PDCCH region.

Also, in MU-MIMO transmission, it is possible to transmit data to a plurality of user terminals UE in the same time and in the same frequency. Consequently, in the PDSCH region of FIG. 2, it may be possible to multiplex data for user terminal UE #1 and data for user terminal UE #5 over the same frequency region. Similarly, it may be also possible to multiplex data for user terminal UE #4 and data for user terminal UE #6 over the same frequency region.

However, as shown in FIG. 2, even when an attempt is made to allocate data for user terminals UE #1 to UE #6 in the PDSCH region, cases might occur where the region for allocating DCI for all of user terminals UE #1 to UE #6 cannot be secured in the PDCCH region. For example, in the PDCCH region of FIG. 2, the DCI for user terminals UE #5 and UE #6 cannot be allocated. In this case, the number of user terminals UE to multiplex over the PDSCH region is limited due to the shortage of the PDCCH region for allocating DCI, and therefore there is a threat that it is not possible to sufficiently achieve the effect of improving the efficiency of use of radio resources by MU-MIMO transmission.

As a method of providing a solution to such shortage of the PDCCH region, it may be possible to expand the region to allocate the PDCCH to beyond the control region that is maximum three OFDM symbols from the top of a subframe (that is, expand the PDCCH region into the conventional PDSCH region, which is from the fourth OFDM symbol onward). As for the method of expanding the PDCCH region, there are a method of time-division-multiplexing the PDSCH and the PDCCH in the conventional PDSCH region as shown in FIG. 3A (TDM approach), and a method of frequency-division-multiplexing the PDSCH and the PDCCH in the conventional PDSCH region as shown in FIG. 3B (FDM approach).

Figure 3A:
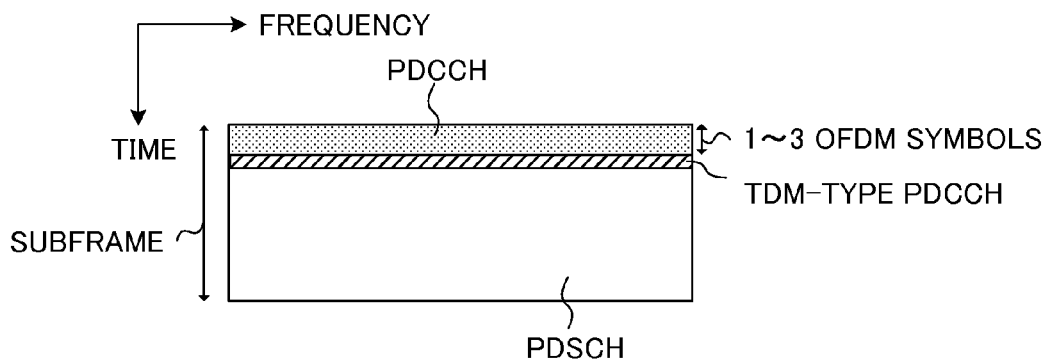
FIG. 3 provides diagrams to explain enhanced PDCCH subframe structures.
Figure 3B:
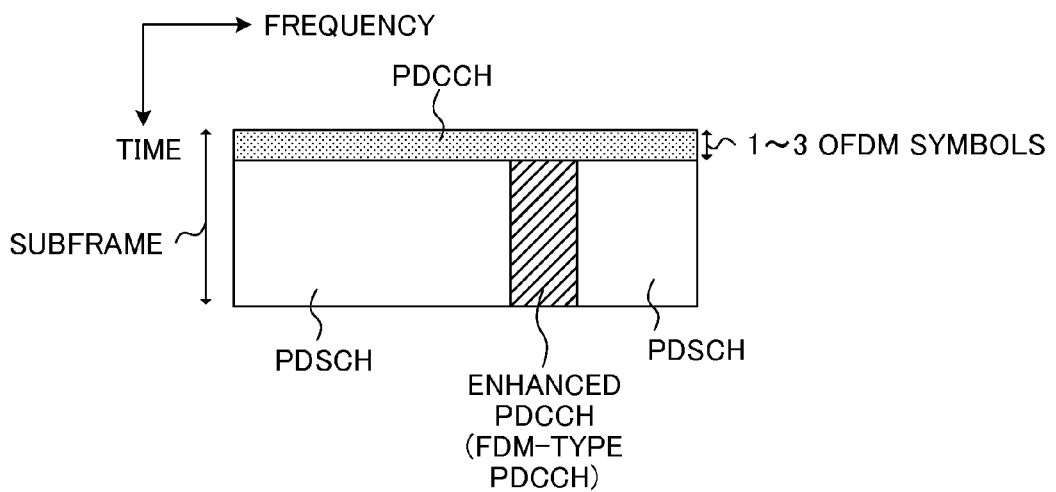

In the TDM approach shown in FIG. 3A, the PDCCH is placed over the entire system band in part of the OFDM symbols from the fourth OFDM symbol onward in the subframe. Meanwhile, in the FDM approach shown in FIG. 3B, the PDCCH is placed in part of the system band in all of the OFDM symbols from the fourth OFDM symbol onward in the subframe. This PDCCH, frequency-division-multiplexed with the PDSCH in the FDM approach, is demodulated using a demodulation reference signal (DM-RS), which is a user-specific reference signal. Consequently, DCI that is transmitted in this PDCCH can achieve beamforming gain, like downlink data that is transmitted in the PDSCH does, and therefore it is effective to increase the capacity of the PDCCH. In the future, it is expected that this FDM approach will gain greater importance.

Hereinafter, a PDCCH that is frequency-division-multiplexed with the PDSCH in the FDM approach will be referred to as an "enhanced PDCCH." This enhanced PDCCH may also be referred to as an "enhanced downlink control channel (enhanced physical downlink control channel)," an "ePDCCH," an "E-PDCCH," an "FDM-type PDCCH," a "UE-PDCCH," and so on.

Figure 4A:
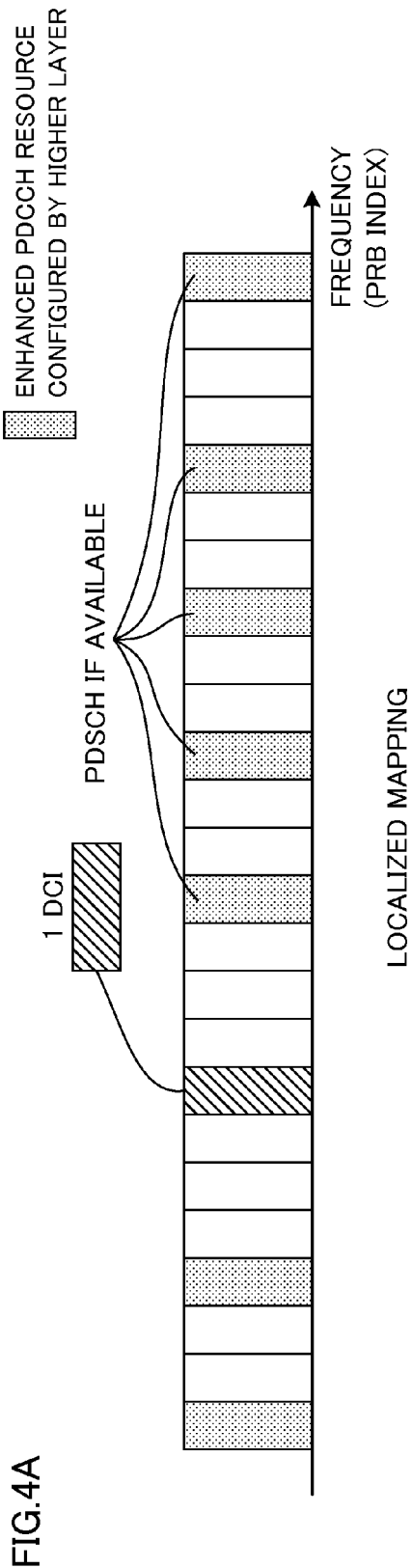
FIG. 4 provides diagrams to explain enhanced PDCCH mapping methods.

With the enhanced PDCCH in the FDM approach such as described above, localized mapping and distributed mapping are studied as methods of mapping DCI. FIG. 4 provides diagrams to explain methods of mapping DCI in an enhanced PDCCH. FIG. 4A shows localized mapping, and FIG. 4B shows distributed mapping.

Figure 4B:
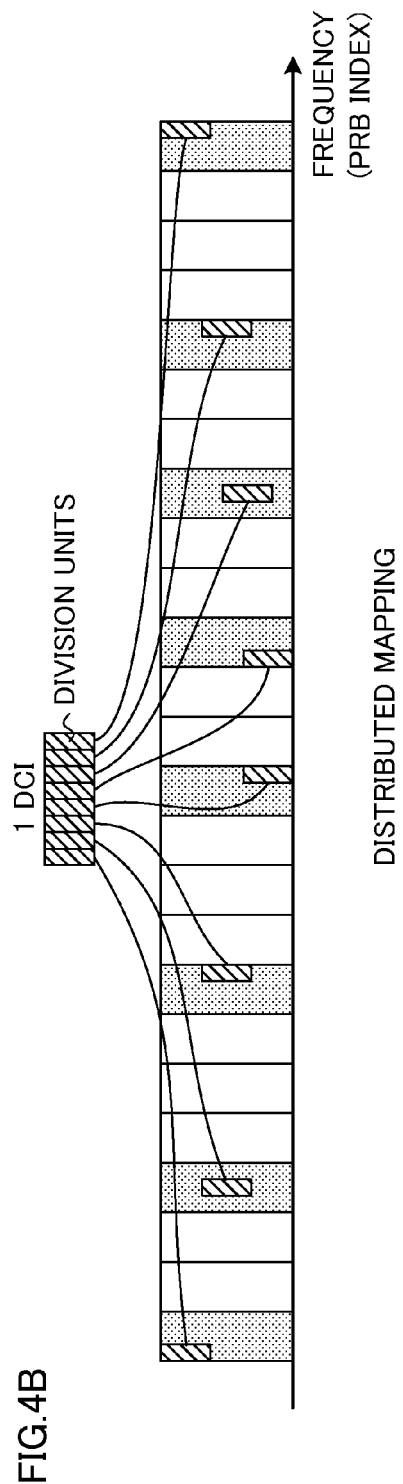

As shown in FIGS. 4A and 4B, an enhanced PDCCH is formed with a predetermined number of physical resource block (PRB) pairs that are distributed over the system band. A PRB pair is formed with two PRBs that are consecutive along the time direction, and is identified by a PRB index that is assigned along the frequency direction. A plurality of PRB pairs to constitute an enhanced PDCCH are determined by a higher layer. The PRB indices to identify each of these plurality of PRB pairs are reported to a user terminal UE through higher layer signaling. Also, there are cases where a plurality of PRB pairs to constitute an enhanced PDCCH are determined in advance by the specifications.

As shown in FIG. 4A, in localized mapping, one piece of DCI is mapped, in a localized manner, to a specific PRB pair constituting an enhanced PDCCH. To be more specific, based on channel quality information (for example, CQI) that is fed back from a user terminal UE, one piece of DCI is mapped in a predetermined number of PRB pairs (for example, one or two PRB pairs of good channel quality). By this means, frequency scheduling gain can be achieved with localized mapping. Note that, in FIG. 4A, among a plurality of PRB pairs to constitute an enhanced PDCCH, the PDSCH may be mapped to those PRB pairs where no DCI is mapped.

As shown in FIG. 4B, in distributed mapping, one piece of DCI is mapped, in a distributed manner, to a plurality of PRB pairs constituting an enhanced PDCCH. To be more specific, one piece of DCI is divided into a plurality of division units, and the division units are mapped to a plurality of PRB pairs mentioned above (or may be allocated to all the PRB pairs) in a distributed manner. With distributed mapping, frequency diversity gain can be achieved by distributing one piece of DCI over the system band.

Figure 5A:
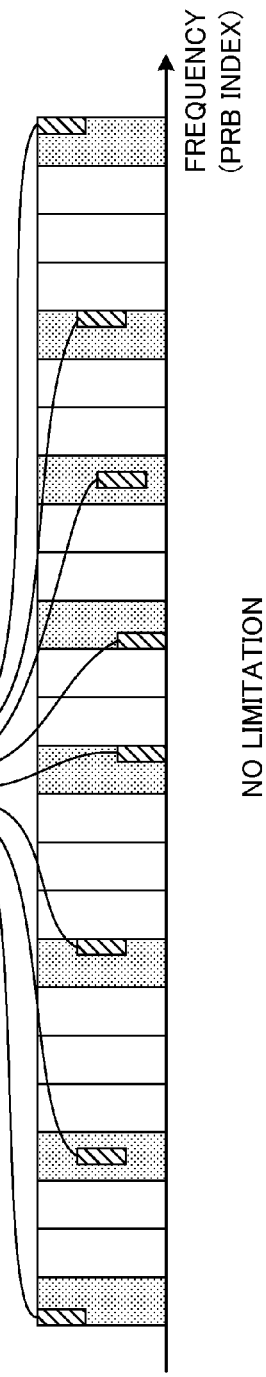
FIG. 5 provides diagrams to show examples of enhanced PDCCH distributed mapping.

In this way, in distributed mapping, unlike localized mapping, each piece of DCI is divided into a plurality of division units, and the division units are mapped to a plurality of PRB pairs constituting an enhanced PDCCH in a distributed manner. Consequently, as shown in FIG. 5A, when an enhanced PDCCH is formed with many PRB pairs (in FIG. 5A, eight PRB pairs), an attempt to map only one piece of DCI results in lowered efficiency of use of radio resources. This is because the division units of one piece of DCI are mapped to many PRB pairs in a distributed manner, and the number of PRB pairs where the PDSCH can be mapped decreases.

Figure 5B:
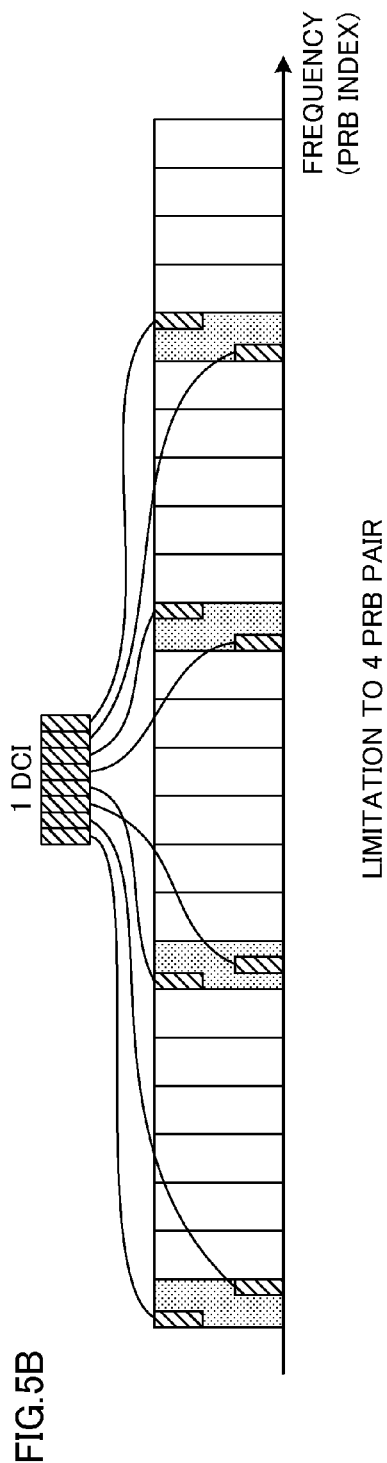

So, in distributed mapping, as shown in FIG. 5B, a study is in progress to limit the number of PRB pairs where the division units of one piece of DCI are mapped in a distributed manner. In FIG. 5B, the number of PRB pairs where the division units of one piece of DCI are mapped in a distributed manner is limited to four. Consequently, in FIG. 5B, compared with the case shown in FIG. 5A, the number of PRB pairs where the PDSCH can be mapped increases.

Figures 6A, 6B:
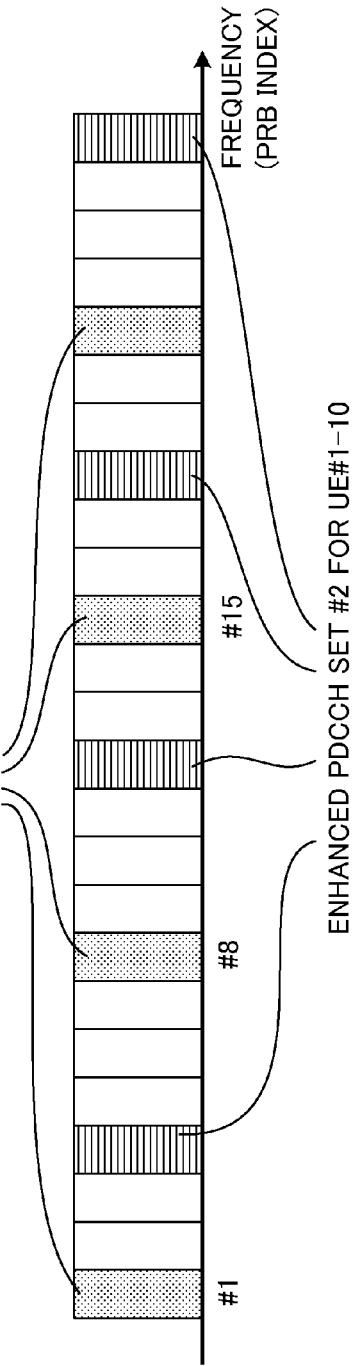
FIG. 6 provides diagrams to show examples of enhanced PDCCH sets.

Furthermore, a study is also in progress to configure a plurality of enhanced PDCCH sets for each user terminal UE when an enhanced PDCCH that is frequency-division-multiplexed with the PDSCH is used (FDM approach). As shown in FIG. 6A, each enhanced PDCCH set is formed by including a plurality of PRB pairs that are allocated to the enhanced PDCCH. Note that an enhanced PDCCH set may be referred to as an "enhanced PDCCH set," an "ePDCCH set," an "E-PDCCH set," or may be referred to simply as a "set."

In FIG. 6A, enhanced PDCCH sets #1 and #2 are configured for user terminals UE #1 to UE #10 in an overlapping manner. In FIG. 6A, when the number of user terminals UE that are subject to transmission of DCI is smaller than a predetermined number, DCI is mapped to only one enhanced PDCCH set #1, so that the other enhanced PDCCH set #2 can be used for the PDSCH. In this way, by configuring a plurality of enhanced PDCCH sets for each user terminal UE in an overlapping manner, it is possible to improve the efficiency of use of radio resources.

As shown in FIG. 6A, when enhanced PDCCH sets #1 and #2 are configured for each user terminal UE, each user terminal UE needs to blind-decode the search space candidates (candidates for a search space) of both enhanced PDCCH sets #1 and #2. In this case, as shown in FIG. 6B, the number of search space candidates for one enhanced PDCCH set may be configured such that the number of search space candidates for enhanced PDCCH sets #1 and #2 as a whole does not increase compared to the case where no PDCCH set is configured. By this means, even when each user terminal UE blind-decodes a plurality of enhanced PDCCH sets, it is still possible to prevent the increase of the number of times of blind decoding.

As described above, when an enhanced PDCCH set that is formed with N (N≥1) PRB pairs is defined and K (K≥1) enhanced PDCCH sets are configured for each user terminal UE, in each enhanced PDCCH set, DCI may be mapped in distributed mapping (see FIG. 4B and FIG. 5) or may be mapped in localized mapping (see FIG. 4A).

Now, in order to achieve frequency scheduling gain when DCI is mapped in localized mapping in an enhanced PDCCH set, it is preferable to place a plurality of search space candidates of the enhanced PDCCH in different PRB pairs constituting the enhanced PDCCH set.

For example, referring to FIGS. 6A and 6B, when aggregation level 1 applies to enhanced PDCCH set #1, three search space candidates are provided. When these three search space candidates are placed in three varying PRB pairs #1, #8 and #15 in FIG. 6A, respectively, it is possible to achieve frequency scheduling gain by mapping DCI to the search space candidate to PRB pair #15 of the best channel quality.

Meanwhile, when the above-noted three search space candidates are placed in the same PRB pair #1 of FIG. 6A, even if the channel quality of PRB pair #1 is poor, there is no other choice but to map DCI to a search space candidate placed in this PRB pair #1. Consequently, it is not possible to achieve frequency scheduling gain by localized mapping of DCI.

Also, in order to reduce the probability of blocking when DCI is mapped in localized mapping in an enhanced PDCCH set, it is preferable to form each search space candidate of the enhanced PDCCH set with random ECCEs on a per subframe basis. That is, it is preferable to make the index numbers of the ECCEs to constitute each search space candidate random on a per subframe basis.

In this way, when DCI is mapped in localized mapping in an enhanced PDCCH set, it is expected that the search space candidates are formed in such a way that frequency scheduling gain can be achieved. It is also expected that the search space candidates are formed such that the probability of blocking can be reduced.

Figure 7:
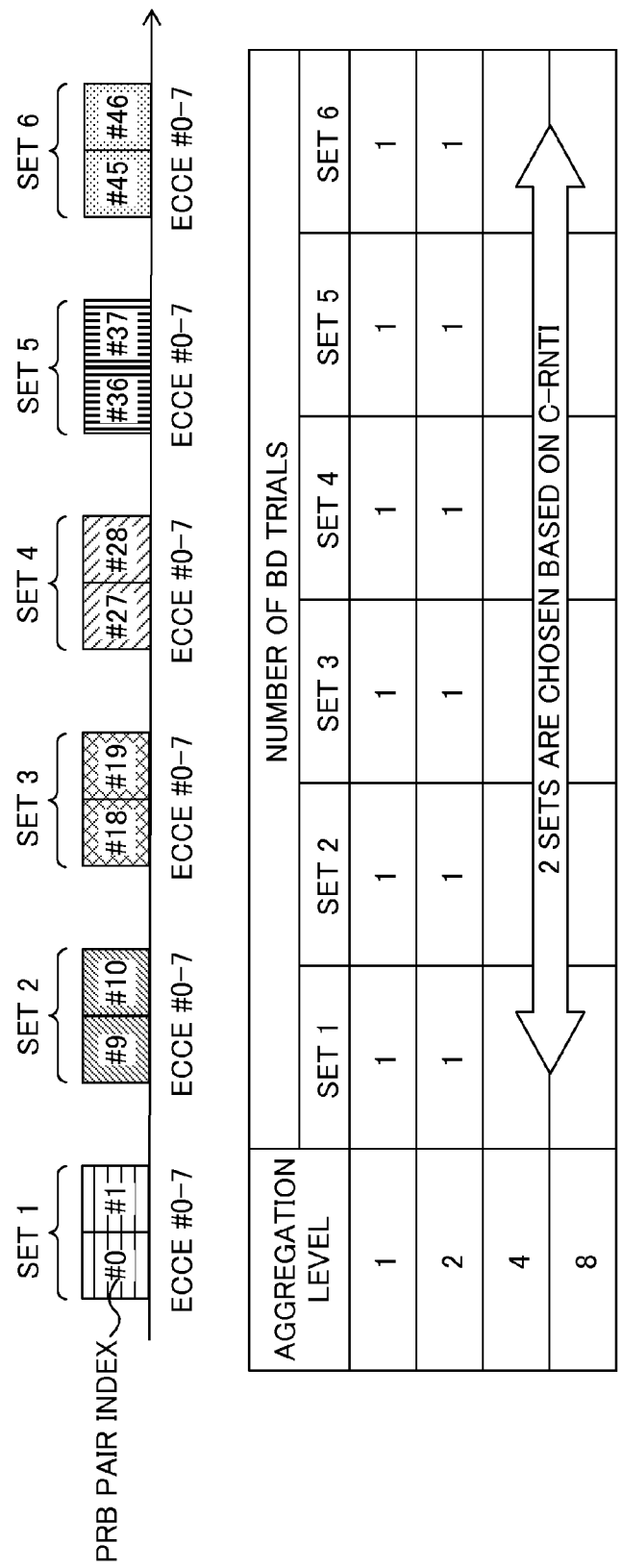
FIG. 7 is a diagram to explain an example of a method of forming search space candidates.
Figure 8:
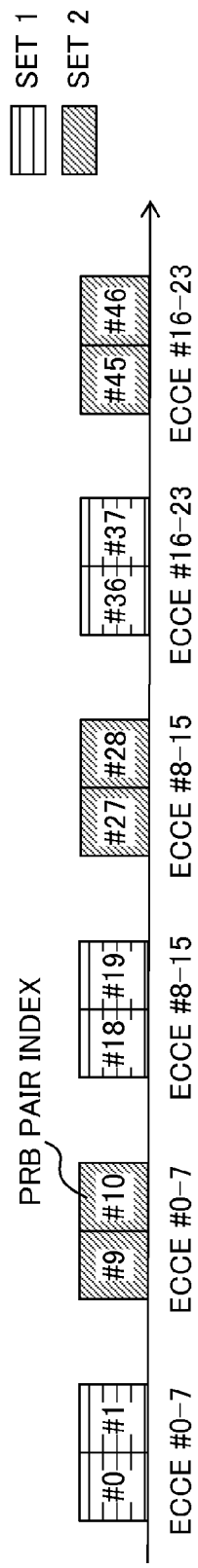
FIG. 8 is a diagram to explain an example of a method of forming search space candidates.

FIG. 7 and FIG. 8 provide diagrams to explain examples of forming search spaces when DCI is mapped in localized mapping in an enhanced PDCCH set.

FIG. 7 shows a case where six enhanced PDCCH sets are configured for each user terminal UE, and where each enhanced PDCCH set is formed with two PRB pairs (that is, a case where K=6 and N=2). In the case illustrated in FIG. 7, the number of search space candidates per enhanced PDCCH set is configured such that the number of times of blind decoding in user terminals UE does not increase compared to the case where no enhanced PDCCH set is provided.

For example, when the aggregation level is 1 and 2, the number of search space candidates is "6" if no enhanced PDCCH set is provided, so that the number of search space candidates for enhanced PDCCH sets 1 to 6 is "1." In this case, the ECCEs to constitute the search space candidates of each enhanced PDCCH set are determined, for example, based on the hash function shown in equation 1:

$$L\{(Y_k+m') \bmod \lfloor N_{ECCE,k}/L \rfloor\}+i \quad \text{(Equation 1)}$$

$$Y_k=(A \cdot Y_{k-1}) \bmod D \quad \text{(Equation 2)}$$

In equation 1, $N_{ECCE}$ is the total number of ECCEs per enhanced PDCCH set (eight in FIG. 7). Also, L is the aggregation level. Furthermore, i=0, . . . , L−1. Note that m' is equal to m, and m=0, . . . , $M^{(L)}$−1. Also, $M^{(L)}$ is the number of search space candidates at aggregation level L (which is one when L=1 and 2 in FIG. 7). Also, $Y_k$ in equation 1 is defined by equation 2. In equation 2, A=39827 and D=65537, and k is a parameter that varies per subframe.

Meanwhile, when the aggregation level is 4 and 8, the number of search space candidates is "2" if no enhanced PDCCH set is provided. Consequently, it is not possible to provide search space candidates for all of enhanced PDCCH sets 1 to 6. In this case, for example, it may be possible to select PRB pairs randomly based on C-RNTIs (Cell-Radio Network Temporary IDs) and so on, and form the search space candidates with the ECCEs in the selected PRB pairs.

As shown in FIG. 7, when six enhanced PDCCH sets are configured (when K=6) for user terminals UE, the six search space candidates for enhanced PDCCH sets 1 to 6 are all placed in different PRB pairs. Consequently, frequency scheduling gain can be achieved by using search space candidates of enhanced PDCCH sets that are placed in PRB pairs of good channel quality.

Also, with above equation 1, the parameter $Y_k$ that varies per subframe is taken into account, so that the ECCEs to constitute the search space candidates of enhanced PDCCH sets 1 to 6 have different index numbers. Consequently, it is possible to reduce the probability of blocking.

Meanwhile, the method of determining the ECCEs to constitute search space candidates differs when the aggregation level is 1 and 2 and when the aggregation level is 4 and 8. Also, in distributed mapping, cases might occur where two or three enhanced PDCCH sets are configured for each user terminal UE (when K=2 or 3), so that it is expected to support such cases even in localized mapping as well.

FIG. 8 shows a case where two enhanced PDCCH sets are configured for each user terminal UE and each enhanced PDCCH set is formed with six PRB pairs (that is, when K=2 and N=6). In the case illustrated in FIG. 8, again, the number of search space candidates per enhanced PDCCH set is configured such that the number of times of blind decoding in user terminals UE does not increase compared to the case where no enhanced PDCCH set is provided.

For example, when the aggregation level is 1, the number of search space candidates is "6" if no enhanced PDCCH set is provided, so that the number of search space candidates is "3" in both enhanced PDCCH sets 1 and 2. In this case, if the ECCEs to constitute the search space candidates for each enhanced PDCCH set are determined based on, for example, the hash function shown in equation 1, cases might occur where the three search space candidates of each enhanced PDCCH set are not all placed in different PRB pairs.

To be more specific, assume that, at aggregation level 1, ECCE #0 is determined to be the first search space candidate of enhanced PDCCH set 1 by above equation 1. In this case, according to above equation 1, ECCEs #1 and #2 are determined to be the second and third search space candidates of enhanced PDCCH set 1, respectively. Here, ECCEs #0 to #3 of enhanced PDCCH set 1 are all included in PRB pair #0. Consequently, the three search space candidates of enhanced PDCCH set 1 are all placed in the same PRB pair #0.

Similarly, assume that, at aggregation level 1, ECCE #7 is determined to be the first search space candidate in enhanced PDCCH set 2 by above equation 1. In this case, according to above equation 1, ECCEs #8 and #9 are determined to be the second and third search space candidates of enhanced PDCCH set 2, respectively. Here, ECCE #7 of enhanced PDCCH set 2 is included in PRB pair #10, and ECCE #8 and #9 are included in PRB pair #27. Consequently, the two search space candidates of enhanced PDCCH set 2 are placed in the same PRB pair #27.

As shown in FIG. 8, when two enhanced PDCCH sets are configured for each user terminal UE (when K=2), cases might occur where the three search space candidates of each enhanced PDCCH set are not all placed in different PRB pairs. In this way, when the number of enhanced PDCCH sets (K) configured for each user terminal UE is smaller than the number of search space candidates (for example, "6") as of when no enhanced PDCCH set is provided, the probability that different search space candidates are placed in the same PRB pairs increases. As a result of this, there is a problem that it becomes difficult to achieve frequency scheduling gain by localized mapping of DCI.

So, the present inventors have studied a method of forming search space candidates, whereby frequency scheduling gain by localized mapping of DCI can be achieved, even when the number of enhanced PDCCH sets to be configured for each user terminal UE is smaller than the number of search space candidates as of when no enhanced PDCCH set is provided (for example, when K<6), and arrived at the present invention.

According to a first example of the present invention, for a user terminal UE, a radio base station configures a plurality of enhanced PDCCH sets (resource sets) that are each formed by including a plurality of resource blocks allocated to the enhanced PDCCH. Also, the radio base station determines the enhanced control channel elements to constitute a plurality of search space candidates above such that a plurality of search space candidates of each enhanced PDCCH set are all placed in different resource blocks. A user terminal UE blind-decodes the enhanced control channel elements that are determined thus, and acquires the DCI for the user terminal UE.

By this means, a plurality of search space candidates of each enhanced PDCCH set are all placed in different resource blocks. Consequently, even when the number of enhanced PDCCH sets configured for each user terminal UE is smaller than the number of search space candidates as of when no enhanced PDCCH set is provided, it is still possible to achieve frequency scheduling gain by localized mapping of DCI.

Here, the resource blocks are the frequency resource units to constitute the enhanced PDCCH sets, and are, for example, PRB pairs, PRBs and so on. Although examples will be described below where PRB pairs are used as resource blocks, this is by no means limiting.

Also, the resource blocks are formed by including a plurality of enhanced control channel elements. The enhanced control channel elements are the units of resource allocation to DCI that is to be transmitted in enhanced PDCCHs. An enhanced control channel element may be referred to as, for example, an "ECCE," an "eCCE" and so on. Although an enhanced control channel elements will be referred to as an "ECCE" below and one resource block is formed with four ECCEs, this is by no means limiting. Also, the number of ECCEs aggregated and allocated to one piece of DCI (aggregation level) is, for example, 1, 2, 4, 8 and 16, this is by no means limiting. Also, the ECCEs may be assigned index numbers on a per enhanced PDCCH set basis.

Also, the resource blocks may be formed by including a plurality of enhanced resource element groups (eREGs). For example, it is possible to form one resource block with sixteen eREGs, and form one eREG with nine REs (resource elements). Also, one ECCE may be formed with four eREGs. In this case, the ECCEs may be mapped to resource blocks in eREG units.

Also, with the first example of the present invention, the radio base station may determine the ECCEs to constitute each search space candidate based on the total number of ECCEs, $N_{ECCE}$, in the PRB pairs constituting each enhanced PDCCH set, and the number of search space candidates in each enhanced PDCCH set, $M_{set}^{(L)}$, per aggregation level L.

To be more specific, the radio base station determines the ECCEs to constitute each search space candidate based on the hash function shown in equation 3:

$$L\left\{\left(Y_k + m\left\lfloor\frac{N_{ECCE}}{L \cdot M_{set}^{(L)}}\right\rfloor\right) \mod \lfloor N_{ECCE}/L \rfloor\right\} + i \quad \text{(Equation 3)}$$

In equation 3, $N_{ECCE}$ is the total number of ECCEs in the PRB pairs constituting each enhanced PDCCH set—that is, the total number of ECCEs per enhanced PDCCH set. Also, $M_{set}^{(L)}$ is the number of search space candidates at each aggregation level. L is the aggregation level of the ECCEs. m=0, . . . , $M_{set}^{(L)}$−1, i=0, . . . , L−1, and $Y_k$ is a predetermined parameter that varies per subframe.

Figure 9:
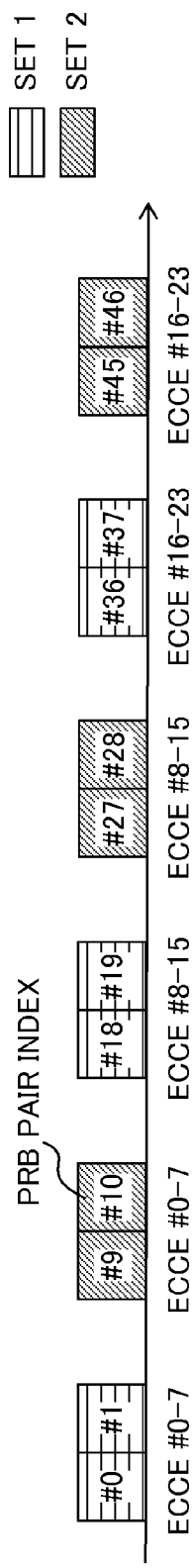
FIG. 9 is a diagram to explain an example of a method of forming search space candidates according to a first example.

Now, a method of forming search space candidates using equation 3 will be described in detail with reference to FIG. 9. FIG. 9 is a diagram to explain a method of forming search space candidates according to the first example. FIG. 9 shows a case where two enhanced PDCCH sets are configured for each user terminal UE, and where each enhanced PDCCH set is formed with six PRB pairs (that is, K=2 and N=6). Note that the number of search space candidates for each enhanced PDCCH set is configured to be the same as in FIG. 8.

Also, in FIG. 9, the PRB pairs to constitute enhanced PDCCH sets 1 and 2 are alternately placed in units of two PRB pairs that are consecutive along the frequency direction. By placing the PRB pairs in units of two PRB pairs that are consecutive along the frequency direction, when one PRB pair is formed with four ECCEs, it is possible to support aggregation level 8 where eight ECCEs are connected. Also, by placing the PRB pairs to constitute each enhanced PDCCH set alternately, it is possible to distribute each enhanced PDCCH over the frequency direction.

Note that the arrangement shown in FIG. 9 is only an example and is by no means limiting. For example, when one PRB pair is formed with eight ECCEs, when aggregation level 8 is not supported and so on, the PRB pairs to constitute each enhanced PDCCH pair may be placed in units of one PRB pair. Also, the PRB pairs to constitute the enhanced PDCCH sets do not have to be placed alternately.

Also, in FIG. 9, the ECCEs to constitute each PRB pair are assigned index numbers on a per enhanced PDCCH set basis. For example, index numbers #0 to #23, which are consecutive along the frequency direction, are assigned to all of the twenty-four ECCEs included in PRB pairs #0, #1, #18, #19, #36 and #37 constituting enhanced PDCCH set 1.

In the case illustrated in FIG. 9, the total number of ECCEs per enhanced PDCCH set, $N_{ECCE}$, is "24." Also, the number of search space candidates per enhanced PDCCH set, $M_{set}^{(L)}$, is "3" when the aggregation level L is 1 and 2, and "1" when the aggregation level L is 4 and 8.

Here, assuming the predetermined parameter $Y_k$=0 in above equation 3, a case will be considered where the aggregation level L=2. In this case, according to above equation 3, ECCE #0 is determined to be the first search space candidate (m=0) of enhanced PDCCH set 1. Also, ECCE #8 is determined to be the second search space candidate (m=1), and ECCE #16 is determined to be the third search space candidate (m=2). ECCEs #0, #8 and #16 of enhanced PDCCH set 1 are included in PRB pairs #0, #18 and #36, respectively. Consequently, the three search space candidates of enhanced PDCCH set 1 at aggregation level 2 are all placed in different PRB pairs.

In similar cases, according to above equation 3, ECCEs #0, #8 and #16 are determined to be the first, second and third search space candidates (m=0, 1 and 2) of enhanced PDCCH set 2, respectively. ECCEs #0, #8 and #16 of enhanced PDCCH set 2 are included in PRB pairs #9, #27 and #45, respectively. Consequently, the three search space candidates of enhanced PDCCH set 2 at aggregation level 2 are also all placed in different PRB pairs.

As described above, according to above equation 3, the ECCEs to constitute each search space candidate are determined taking into account the total number of ECCEs per enhanced PDCCH set, $N_{ECCE}$, and the number of search space candidates per enhanced PDCCH set, $M_{set}^{(L)}$. Consequently, even when the number of enhanced PDCCH sets configured for each user terminal UE is small (for example, K=2 in FIG. 9), a plurality of search space candidates of each enhanced PDCCH set are all placed in different PRB pairs. Consequently, it is possible to achieve frequency scheduling gain when DCI is subject to localized mapping in each enhanced PDCCH set.

Also, according to above equation 3, the ECCEs to constitute each search space candidate are determined taking into account a predetermined parameter $Y_k$, which varies per subframe. Consequently, it is possible to randomize the ECCEs to constitute each search space candidate on a per subframe basis, and, furthermore, reduce the probability of blocking.

Note that above equation 3 is simply an example and is by no means limiting. As long as the total number of ECCEs per enhanced PDCCH set, $N_{ECCE}$, and the number of search space candidates per enhanced PDCCH set, $M_{set}^{(L)}$, are taken into account, it is possible to change the method of calculation, and thereupon other parameters may be added or removed. Also, above equation 3 is by no means limited to the case shown in FIG. 9 (the case where K=2), and is applicable even when the number of enhanced PDCCH sets per user terminal UE, K, is not two.

For example, the radio base station may determine the ECCEs to constitute each search space candidate based on the hash function shown in equation 4, instead of above equation 3:

$$L\left\{\left(Y_k + \left\lfloor m\frac{N_{ECCE}}{L \cdot M_{set}^{(L)}}\right\rfloor\right) \mod \lfloor N_{ECCE}/L \rfloor\right\} + i \quad \text{(Equation 4)}$$

In equation 4, $N_{ECCE}$ is the total number of ECCEs in the PRB pairs constituting each enhanced PDCCH set—that is, the total number of ECCEs per enhanced PDCCH set. Also, $M_{set}^{(L)}$ is the number of search space candidates at each aggregation level. L is the aggregation level of the ECCEs. m=0, . . . , $M_{set}^{(L)}$−1, i=0, . . . , L−1, and $Y_k$ is a predetermined parameter that varies per subframe.

According to above equation 4, when the number of enhanced PDCCH sets configured for each user terminal UE is small (for example, when K=2 in FIG. 9), it is possible to place a plurality of search space candidates of each enhanced PDCCH set all in different PRB pairs, more reliably.

Also, when cross-carrier scheduling is applied to a user terminal UE, the radio base station may determine the ECCEs to constitute each search space candidate of each component carrier based on carrier indicators.

Here, in carrier aggregation, in which a plurality of component carriers (hereinafter referred to as "CCs") are aggregated, "cross-carrier scheduling" refers to using the enhanced PDCCH or PDCCH of a given CC (for example, CC #1) to allocate the PDSCH and PUSCH of that CC and other CCs (for example, CC #1 and CC #2). When cross-carrier scheduling is executed using enhanced PDCCHs, in the PRB pairs constituting the enhanced PDCCH of a given CC (for example, CC #1), the search space candidates for that CC and other CCs (for example, CC #1 and CC #2) are placed.

Also, when cross-carrier scheduling is applied, carrier indicators serve as indicators that show to which CC DCI pertains to, and are set in the CIF (Carrier Indicator Field) attached to the DCI. For example, assuming carrier aggregation in which maximum five CCs are aggregated, the CIF is formed with three bits. In this case, for example, the CIF configuration values "000" to "100" may be associated with CC #1 to CC #5, respectively. Note that the number of CIF bits is determined depending on the number of CCs to be aggregated in carrier aggregation, and is by no means limited to three bits. Also, a carrier indicator may be referred to as a "CI," a "CC indicator," a "carrier indicator field value," a "ServCellIndex" and so on.

To be more specific, when cross-carrier scheduling is applied to a user terminal UE, the radio base station may determine the ECCEs to constitute each search space candidate of each component carrier based on the hash function shown in equation 5:

$$L\left\{\left(Y_k + \left\lfloor m\frac{N_{ECCE}}{L \cdot M_{set}^{(L)}}\right\rfloor + n_{CIF}\right) \bmod \lfloor N_{ECCE}/L\rfloor\right\} + i \quad \text{(Equation 5)}$$

In equation 5, $N_{ECCE}$ is the total number of ECCEs in the PRB pairs constituting each enhanced PDCCH set—that is, the total number of ECCEs per enhanced PDCCH set. Also, $M_{set}^{(L)}$ is the number of search space candidates at each aggregation level. L is the aggregation level of the ECCEs. m=0, . . . , $M_{set}^{(L)}$−1, i=0, . . . , L−1, and $Y_k$ is a predetermined parameter that varies per subframe. Also, $n_{CIF}$ is the above-described carrier indicator. Note that $n_{CIF}$ may be a carrier indicator itself, or may be a predetermined parameter that is associated with that carrier indicator.

Here, with reference to above FIG. 9, a method of forming search space candidates using equation 5 when cross-carrier scheduling is applied to a user terminal UE will be described in detail. Here, cross-carrier scheduling in carrier aggregation with two CCs (for example, CC #1 and CC #2) will be described as an example. Also, assume that, in above equation 5, the predetermined parameter $Y_k$ is 0, the aggregation level L is 1, and the carrier indicators $n_{CIF}$ of CCs #1 and #2 are "0" and "1," respectively.

In this case, according to above equation 5, ECCEs #0, #8 and #16 are determined to be the first, second and third search space candidates (m=0, 1 and 2) of enhanced PDCCH set 1 of CC #1, respectively. Also, based on the carrier indicator "1" of CC #2, ECCEs #1, #9 and #17 are determined to be the first, second and third search space candidates (m=0, 1 and 2) of enhanced PDCCH set 1 of CC #2, respectively. By this means, the three search space candidates of enhanced PDCCH set 1 of CC #1 and CC #2 at aggregation level 1 are all placed in different PRB pairs #0, #18 and #36, respectively.

In similar cases, according to above equation 5, ECCEs #0, #8 and #16 are determined to be the first, second and third search space candidates (m=0, 1 and 2) of enhanced PDCCH set 2 of CC #1, respectively. Also, based on the carrier indicator "1" of CC #2, ECCEs #1, #9 and #17 are determined to be the first, second and third search space candidates (m=0, 1 and 2) of enhanced PDCCH set 2 of CC #2, respectively. By this means, the three search space candidates of enhanced PDCCH set 1 of CC #1 and CC #2 at aggregation level 1 are all placed in different PRB pairs #9, #27 and #45, respectively.

According to above equation 5, the ECCEs to constitute each search space candidate of each CC are determined based on the carrier indicator $n_{CIF}$ of each CC, so that, even when cross-carrier scheduling is applied to the enhanced PDCCHs, it is still possible to place a plurality of search space candidates of each enhanced PDCCH set all in different PRB pairs. Note that the equation to determine the ECCEs to constitute each search space candidate of each CC is not limited to above equation 5 as long as the carrier indicator $n_{CIF}$ is taken into account.

Next, method of forming search space candidates according to second to fifth examples of the present invention will be described with reference to FIGS. 10 to 13. With the above-described first example, localized mapping is employed in all the enhanced PDCCH sets configured for a user terminal UE. Meanwhile, according to the second to fifth examples, localized mapping is applied to part of the enhanced PDCCH sets, while distributed mapping is applied to the rest of the enhanced PDCCH sets. Note that differences from the above-described first example will primarily be described below.

Figure 10:
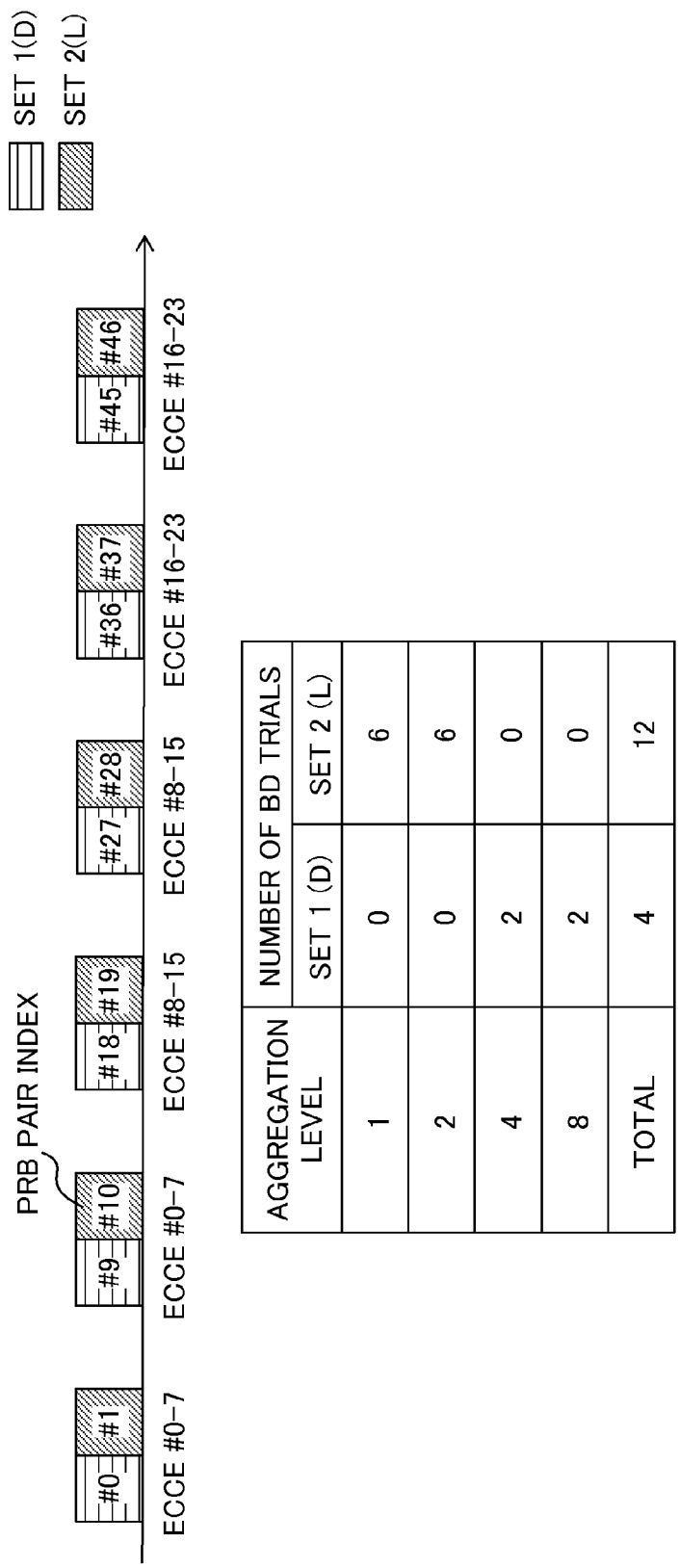
FIG. 10 is a diagram to explain an example of a method of forming search space candidates according to a second example.

FIG. 10 is a diagram to show an example of a method of forming search space candidates according to the second example. FIG. 10 shows a case where two enhanced PDCCH sets are configured for each user terminal UE and each enhanced PDCCH set is formed with six PRB pairs. Also, in FIG. 10, distributed mapping is applied to enhanced PDCCH set 1 and localized mapping is applied to enhanced PDCCH set 2. In this way, in FIG. 10, the number of enhanced PDCCH sets (KD) where distributed mapping is applied, the number of enhanced PDCCH sets (KL) where localized mapping is applied are both set to "1."

In FIG. 10, again, the number of search space candidates of each enhanced PDCCH set is configured such that the number of times of blind decoding in user terminals UE does not increase. However, instead of making the number of search space candidates equal between the enhanced PDCCH sets (see FIG. 9), it is also possible to configure the number of search space candidates unevenly taking into account localized/distributed mapping, as shown in FIG. 10.

For example, in FIG. 10, at aggregation levels 1 and 2, the number of search space candidates is set to "0" in enhanced PDCCH 1, and set to "6" in enhanced PDCCH set 2. Since localized mapping is applied to enhanced PDCCH set 2, it becomes easier to achieve frequency scheduling gain by increasing the number of search space candidates.

By contrast with this, at aggregation levels 4 and 8, the number of search space candidates is set to "2" with enhanced PDCCH 1, and set to "0" with enhanced PDCCH set 2. This is because the number of search space candidates is small when the aggregation level is large and therefore the frequency scheduling gain in localized mapping decreases, and because, in an environment in which channel quality is poor and which requires a large aggregation level, distributed mapping that can achieve frequency diversity gain is more suitable.

Also, in FIG. 10, the PRB pairs to constitute enhanced PDCCH sets 1 and 2 are placed alternately, in one-PRB pair units, along the frequency direction. In FIG. 10, in enhanced PDCCH set 2 where localized mapping is applied, aggregation level 8 to aggregate eight ECCEs is not supported. Consequently, when one PRB pair is formed with four ECCEs, it is possible to place the PRB pair that constitutes enhanced PDCCH set 2 in one-PRB pair units.

In the case illustrated in FIG. 10, in order to determine the ECCEs to constitute each search space candidate, it is possible to use the hash function shown in above equation 3 with respect to enhanced PDCCH set 2 where localized mapping is applied. On the other hand, with enhanced PDCCH set 1 where distributed mapping is applied, it is possible to use the hash function shown in above equation 1.

In this way, in FIG. 10, in enhanced PDCCH set 2 where localized mapping is applied, the ECCEs to constitute each search space candidate are determined using above equation 3. Consequently, even when the number of enhanced PDCCH sets where localized mapping is applied is small (for example, in FIG. 10, KL=1), a plurality of search space candidates are all placed in different PRB pairs. Consequently, it is possible to achieve frequency scheduling gain with enhanced PDCCH set 2 where localized mapping is applied.

Figure 11:
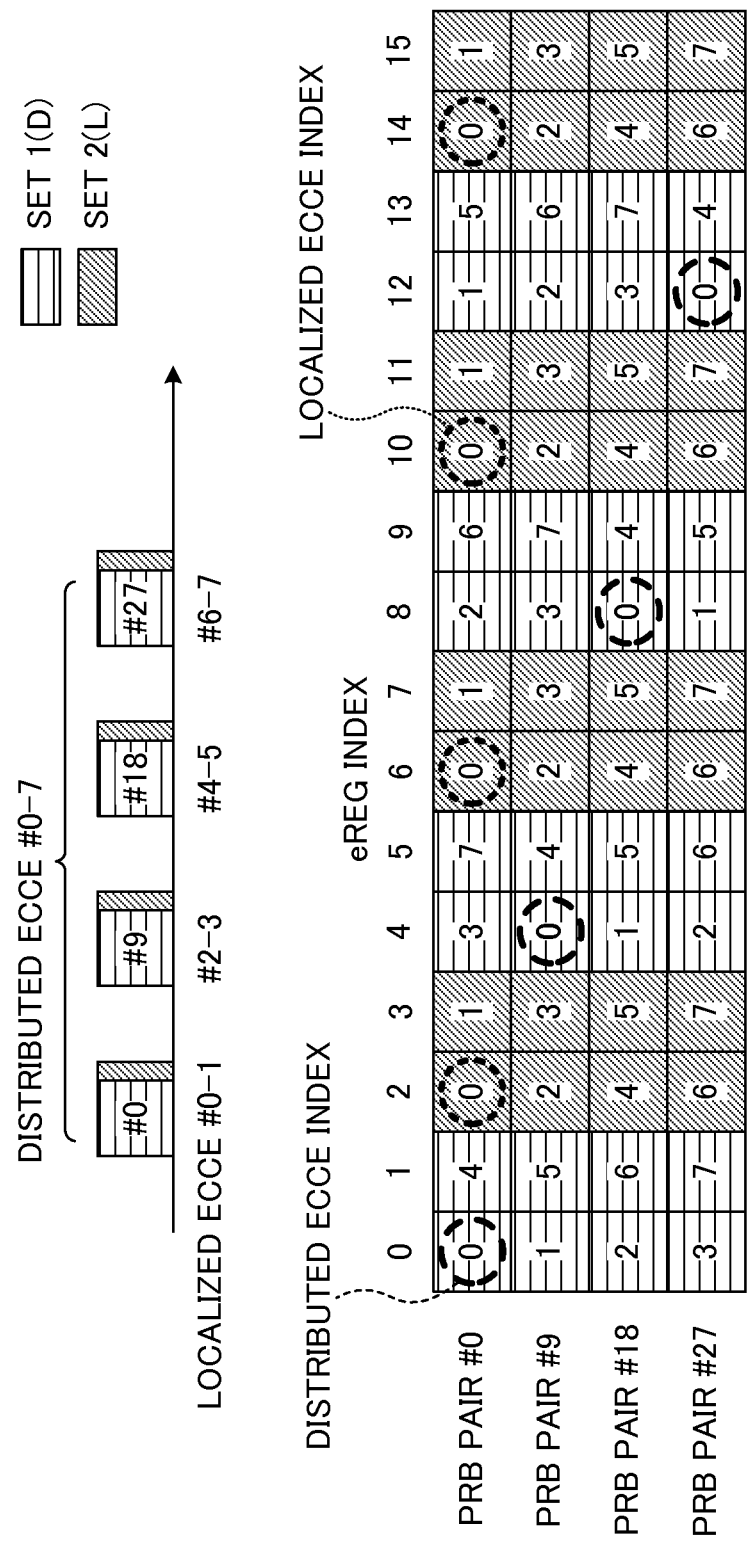
FIG. 11 is a diagram to explain an example of a method of forming search space candidates according to a third example.

FIG. 11 is a diagram to explain a method of forming search space candidates according to the third example. Similar to FIG. 10, in FIG. 11, two enhanced PDCCH sets are configured for each user terminal UE, distributed mapping is applied to enhanced PDCCH set 1, and localized mapping is applied to enhanced PDCCH set 2. Also, it is equally possible to apply localized mapping to enhanced PDCCH set 1 and apply distributed mapping to enhanced PDCCH set 2 as well.

Meanwhile, in FIG. 11, enhanced PDCCH sets 1 and 2 are not formed with different PRB pairs as shown in FIG. 10, but are formed with overlapping PRB pairs. To be more specific, in FIG. 11, one PRB pair is formed by including eight eREGs for enhanced PDCCH set 1 and eight eREGs for enhanced PDCCH set 2. In this case, ECCEs are mapped to the PRB pair in eREG units.

For example, in FIG. 11, the eight eREGs (#2, #3, #6, #7, #10, #11, #14 and #15) in PRB pair #0 are allocated to enhanced PDCCH set 2 where localized mapping is applied. Among these, four eREGs (#2, #6, #10 and #11) constitute ECCE #0 for localized mapping. Also, four eREGs (#3, #7, #11 and #15) constitute ECCE #1 for localized mapping.

In FIG. 11, in enhanced PDCCH set 2 where localized mapping is applied, four eREGs and one ECCE are associated with each other so that the four eREGs to constitute one ECCE are included in the same PRB pair. For example, eREGs #2, #6, #10 and #14 to constitute ECCE #0 for localized mapping (localized ECCE #0) are all included in PRB pair #0.

Meanwhile, with enhanced PDCCH set 1 where distributed mapping is applied, four eREGs and one ECCE are associated with each other so that the four eREGs to constitute one ECCE are all included in different PRB pairs. For example, eREGs #0, #4, #8 and #12 to constitute ECCE #0 for distributed mapping (distributed ECCE #0) are all included in different PRB pairs #0, #9, #18 and #27, respectively.

In the case illustrated in FIG. 11, in enhanced PDCCH set 2 where localized mapping is applied, it is possible to determine the ECCEs to constitute each search space candidate using the hash function shown in above equation 3. Note that, with enhanced PDCCH set 1 where distributed mapping is applied, it is possible to use the hash function shown in above equation 1.

In this way, in FIG. 11, in enhanced PDCCH set 2 where localized mapping is applied, the ECCEs to constitute each search space candidate are determined using above equation 3. Consequently, even when enhanced PDCCH sets 1 and 2 are formed as shown in FIG. 11, the search space candidates of enhanced PDCCH set 2 where localized mapping is applied are all placed in different PRB pairs. Consequently, it is possible to achieve frequency scheduling gain in enhanced PDCCH set 2 where localized mapping is applied.

Figure 12:
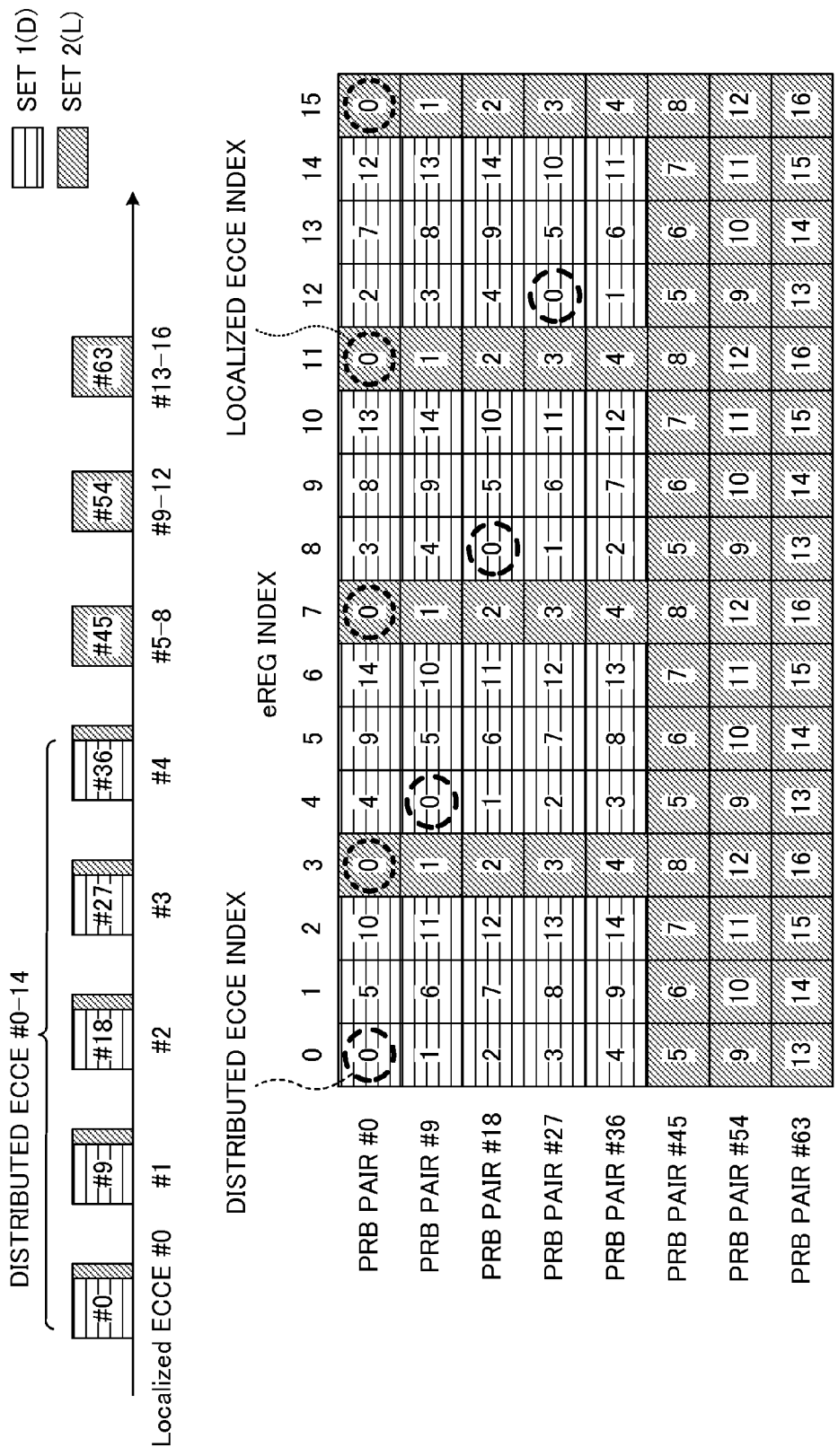
FIG. 12 is a diagram to explain an example of a method of forming search space candidates according to a fourth example.

FIG. 12 is a diagram to explain a method of forming search space candidates according to the fourth example. In FIG. 12, again, two enhanced PDCCH sets are configured for each user terminal UE, distributed mapping is applied to enhanced PDCCH set 1, and localized mapping is applied to enhanced PDCCH set 2.

Meanwhile, in FIG. 12, enhanced PDCCH sets 1 and 2 are not formed with the same number of PRBs, but are formed with different numbers of PRBs. To be more specific, in FIG. 12, enhanced PDCCH set 1 is formed with five PRB pairs. On the other hand, enhanced PDCCH set 2 is formed with eight PRB pairs, which are comprised of five PRB pairs that are used on an overlapping basis with enhanced PDCCH set 1, with an addition of three PRB pairs that are used on a dedicated basis.

Also, in FIG. 12, in the PRB pairs that are used in enhanced PDCCH sets 1 and 2 on an overlapping basis, the ratios of the numbers of eREGs to constitute enhanced PDCCH sets 1 and 2 are not the same like in FIG. 11, but are different. To be more specific, one PRB pair is formed by including twelve eREGs for enhanced PDCCH set 1 and four eREGs for enhanced PDCCH set 2. This ratios may be determined by the specifications, or may be reported by way of higher layer signaling.

For example, in FIG. 12, the four eREGs (#3, #7, #11 and #15) in PRB pair #0 that are used in enhanced PDCCH sets 1 and 2 on an overlapping basis are allocated to enhanced PDCCH set 2 where localized mapping is applied. These four eREGs (#3, #7, #11 and #15) constitute ECCE #0 for localized mapping.

Also, in FIG. 12, in PRB pair #45, which is used by enhanced PDCCH set 2 on a dedicated basis, four ECCEs #5 to #8 for localized mapping are formed with sixteen eREGs (#0 to #15). To be more specific, ECCE #5 of PRB pair #45 is formed with four eREGs (#0, #4, #8 and #12). In this way, in FIG. 12, one ECCE in one PRB pair may be formed with four distributed eREGs, not with four consecutive eREGs.

In the case illustrated in FIG. 12, again, in enhanced PDCCH set 2 where localized mapping is applied, it is possible to determine the ECCEs to constitute each search space candidate using the hash function shown in above equation 3. By this means, even when enhanced PDCCH sets 1 and 2 are formed as shown in FIG. 12, the search space candidates of enhanced PDCCH set 2 where localized mapping is applied are all placed in different PRB pairs. Consequently, it is possible to achieve frequency scheduling gain in enhanced PDCCH set 2 where localized mapping is applied.

Figure 13:
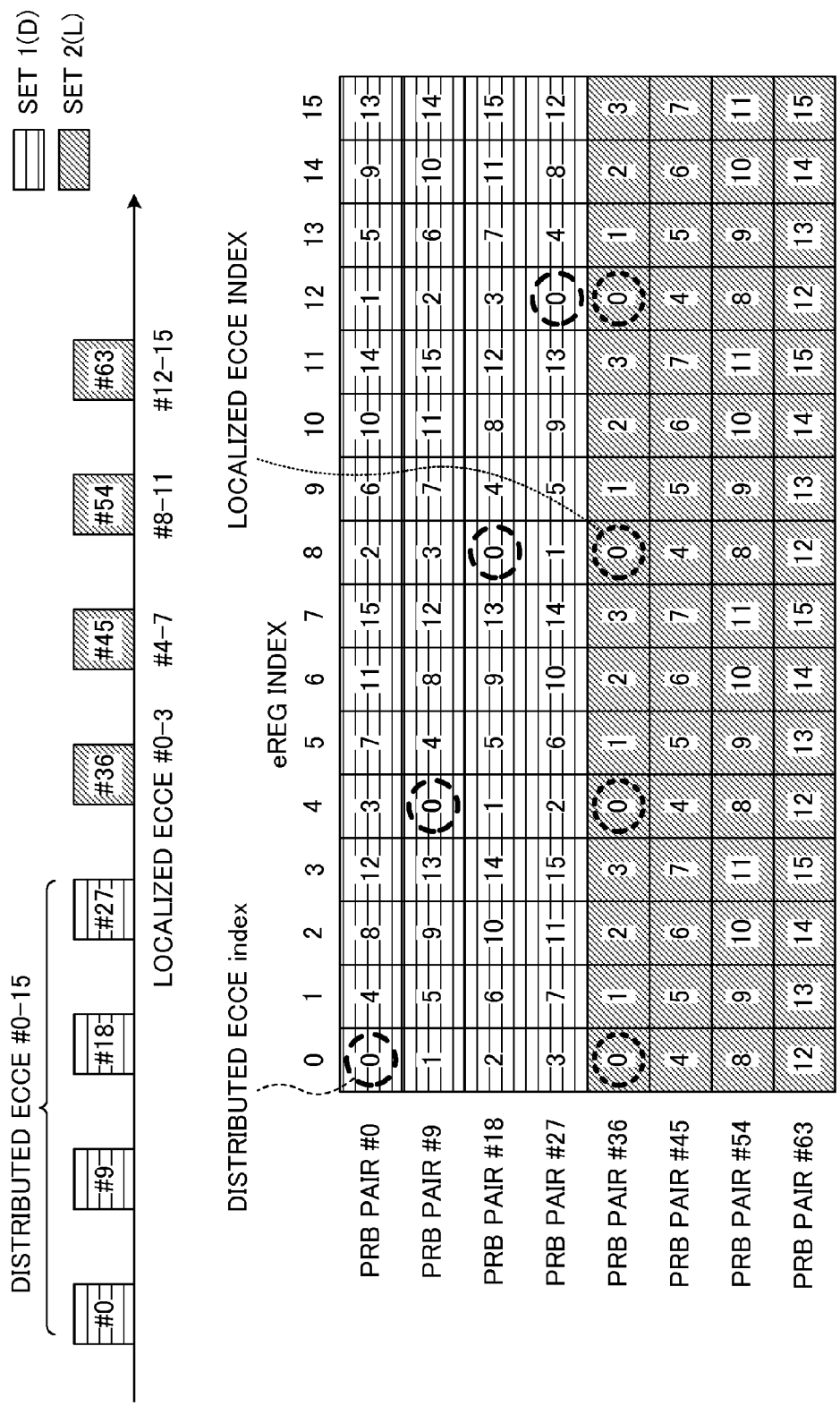
FIG. 13 is a diagram to explain an example of a method of forming search space candidates according to a fifth example.

FIG. 13 is a diagram to explain a method of forming search space candidates according to the fifth example. In FIG. 13, again, two enhanced PDCCH sets are configured for each user terminal UE, distributed mapping is applied to enhanced PDCCH set 1, and localized mapping is applied to enhanced PDCCH set 2.

In FIG. 11 and FIG. 12 above, when enhanced PDCCH sets 1 and 2 are formed with PRB pairs that overlap at least in part, ECCEs are mapped to the PRB pairs in eREG units. However, the above mapping in eREG units may be employed when enhanced PDCCH sets 1 and 2 are each formed with different PRB pairs as shown in FIG. 13.

As has been described above, the configurations of enhanced PDCCH sets 1 and 2 shown in FIGS. 9 to 13 are only examples and are by no means limiting. For example, the number of eREGs per PRB pair and the number of eREGs per ECCE are not limited to the ones shown in FIGS. 11 to 13. Also, obviously, the configurations shown in FIGS. 9 to 13 are applicable even when the number of enhanced PDCCH sets is two or greater.

Also, with the methods of forming search space candidates according to the second to fifth examples, which have been described with reference to FIGS. 10 to 13, in an enhanced PDCCH set where localized mapping is applied, the ECCEs to constitute each search space candidate may be determined using above equation 4.

Also, with the methods of forming search space candidates according to the second to fifth examples, which have been described with reference to FIGS. 10 to 13, if cross-carrier scheduling is applied to a user terminal UE, in an enhanced PDCCH set where localized mapping is applied, the ECCEs to constitute each search space candidate of each CC may be determined based on carrier indicators. To be more specific, the ECCEs to constitute each search space candidate of each CC may be determined using above equation 5.

Now, a radio communication system according to the present embodiment will be described in detail. In this radio communication system, the above-described methods of forming search space candidates according to the first to fifth examples are employed.

(Configuration of Radio Communication System)

Figure 14:
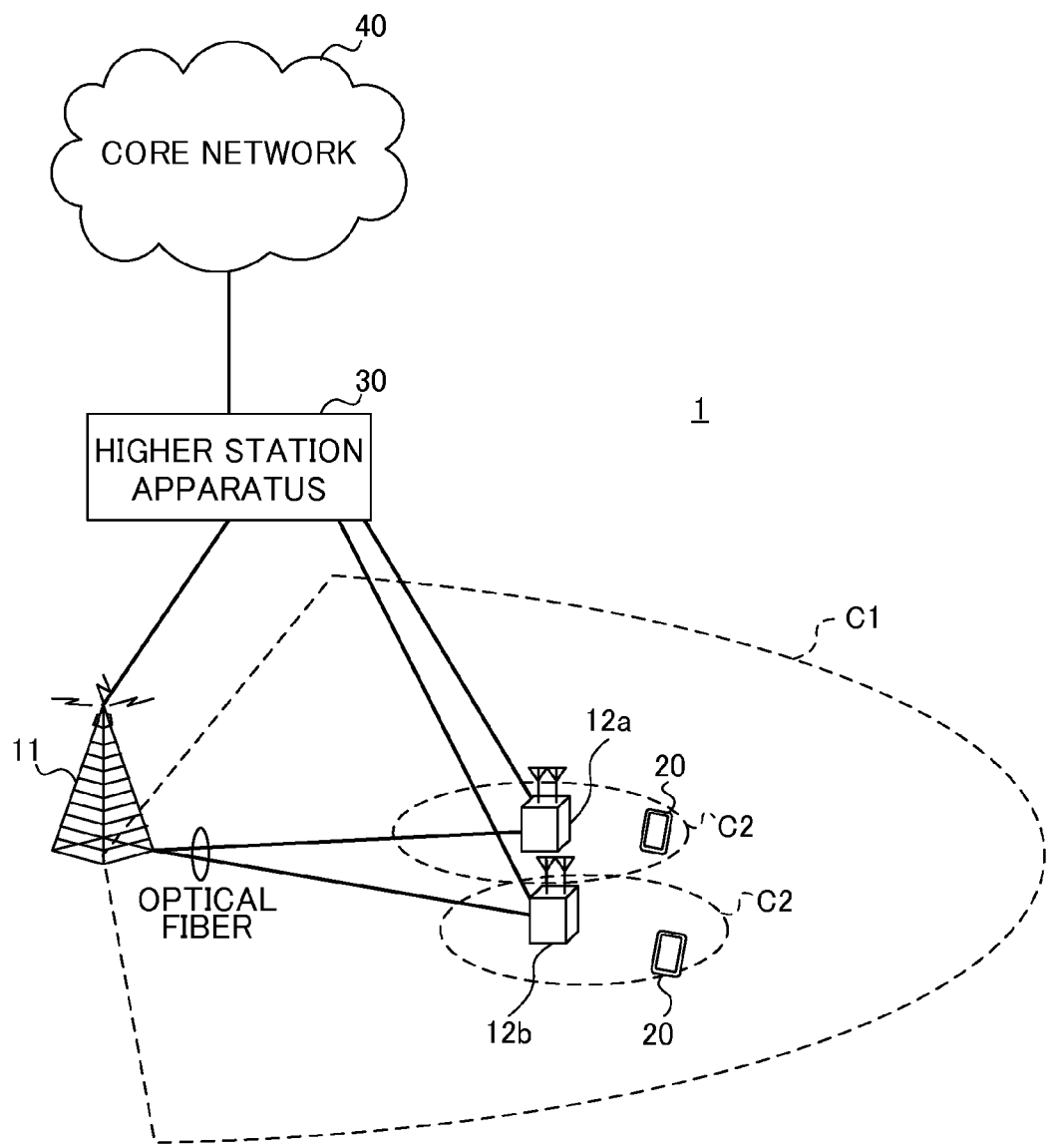
FIG. 14 is a diagram to explain a system structure of a radio communication system according to the present embodiment.

FIG. 14 is a schematic configuration diagram of a radio communication system according to the present embodiment. Note that the radio communication system shown in FIG. 14 is a system to accommodate, for example, the LTE system or SUPER 3G. This radio communication system adopts carrier aggregation to group a plurality of fundamental frequency blocks (component carriers) into one, where the system band of the LTE system constitutes one unit. Also, this radio communication system may be referred to as "IMT-Advanced," or may be referred to as "4G" or "FRA (Future Radio Access)."

As shown in FIG. 14, a radio communication system 1 includes a radio base station 11 that forms a macro cell C1, and radio base stations 12a and 12b that form small cells C2, which are placed inside the macro cell C1 and which are narrower than the macro cell C1. Also, in the macro cell C1 and in each small cell C2, user terminals 20 are placed. The user terminals 20 are configured to be able to perform radio communication with both the radio base station 11 and the radio base stations 12.

Between the user terminals 20 and the radio base station 11, communication is carried out using a carrier of a relatively low frequency band (for example, 2 GHz) and a wide bandwidth (referred to as, for example, "conventional carrier," "legacy carrier" and so on). Meanwhile, between the user terminals 20 and the radio base stations 12, a carrier of a relatively high frequency band (for example, 3.5 GHz and so on) and a narrow bandwidth may be used, or the same carrier as that used between the user terminals 20 and the radio base station 11 may be used. The radio base station 11 and each radio base station 12 are connected by wire connection or by wireless connection.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "radio base station apparatus," a "transmission point" and so on. Also, the radio base stations 12 are radio base stations having local coverages, and may be referred to as "pico base stations," "femto base stations," "Home eNodeBs," "RRHs (Remote Radio Heads)," "micro base stations," "transmission points" and so on. The radio base stations 11 and 12 will be collectively referred to as "radio base station 10," unless distinction needs to be drawn. Each user terminal 20 is a terminal that supports various communication schemes such as LTE, LTE-A and so on, and may be both a mobile communication terminal and a fixed communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system shown in FIG. 14 will be described. Downlink communication channels include a PDSCH (Physical Downlink Shared Channel), which is used by each user terminal 20 on a shared basis, and downlink L1/L2 control channels (PDCCH, PCFICH and PHICH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Also, scheduling information for the PDSCH and the PUSCH and so on may be transmitted by the enhanced PDCCH (referred to as, for example, an "E-PDCCH," an "FDM-type PDCCH" and so on). This enhanced PDCCH (enhanced downlink control channel) is frequency-division-multiplexed with the PDSCH (downlink shared data channel), and used to cover the shortage of the capacity of the PDCCH.

Uplink control channels include the PUSCH (Physical Uplink Shared CHannel), which is used by each user terminal 20 on a shared basis as an uplink data channel, and the PUCCH (Physical Uplink Control CHannel), which is an uplink control channel. User data and higher control information are transmitted by this PUSCH. Also, by means of the PUCCH, downlink radio quality information (CQI: Channel Quality Indicator), ACK/NACK and so on are transmitted.

Figure 15:
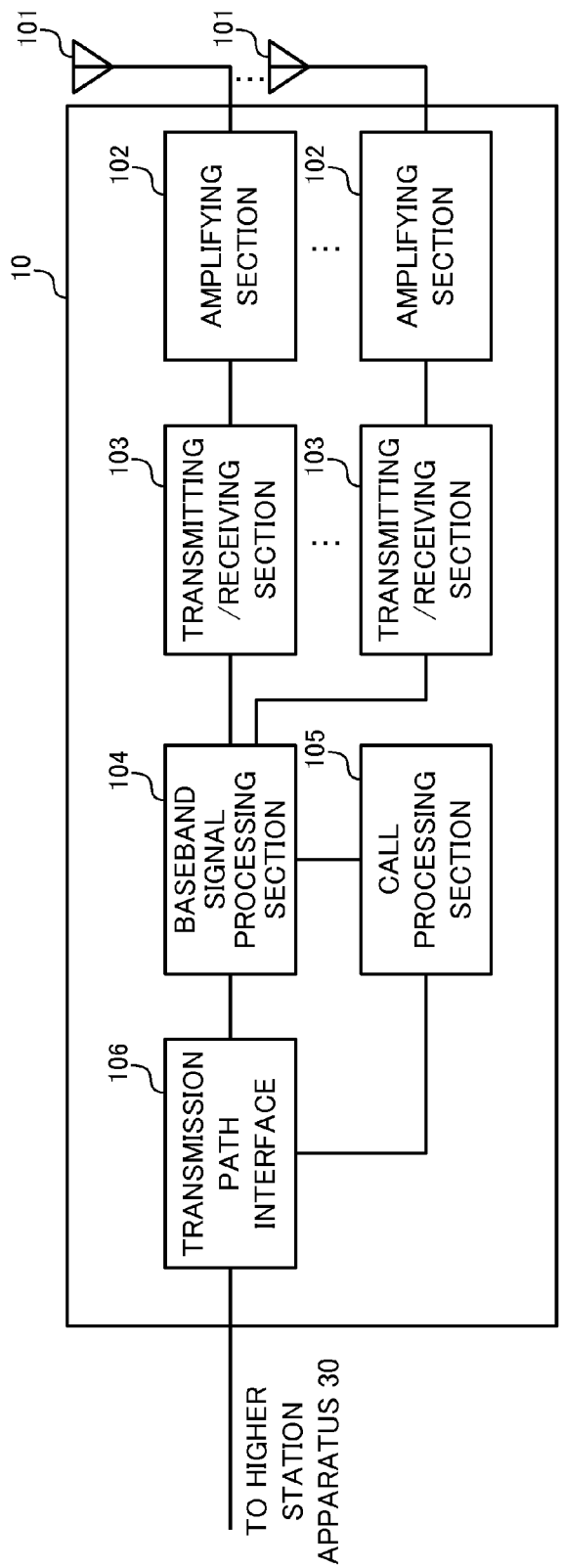
FIG. 15 is a diagram to explain an overall structure of a radio base station according to the present embodiment.

FIG. 15 is a diagram to show an overall structure of a radio base station 10 (which may be either the radio base station 11 or 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminal 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminal 20, control information for allowing communication in the cell, through a broadcast channel. The information for allowing communication in the cell includes, for example, the uplink or downlink system bandwidth and so on.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data to be transmitted from the user terminal 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 16:
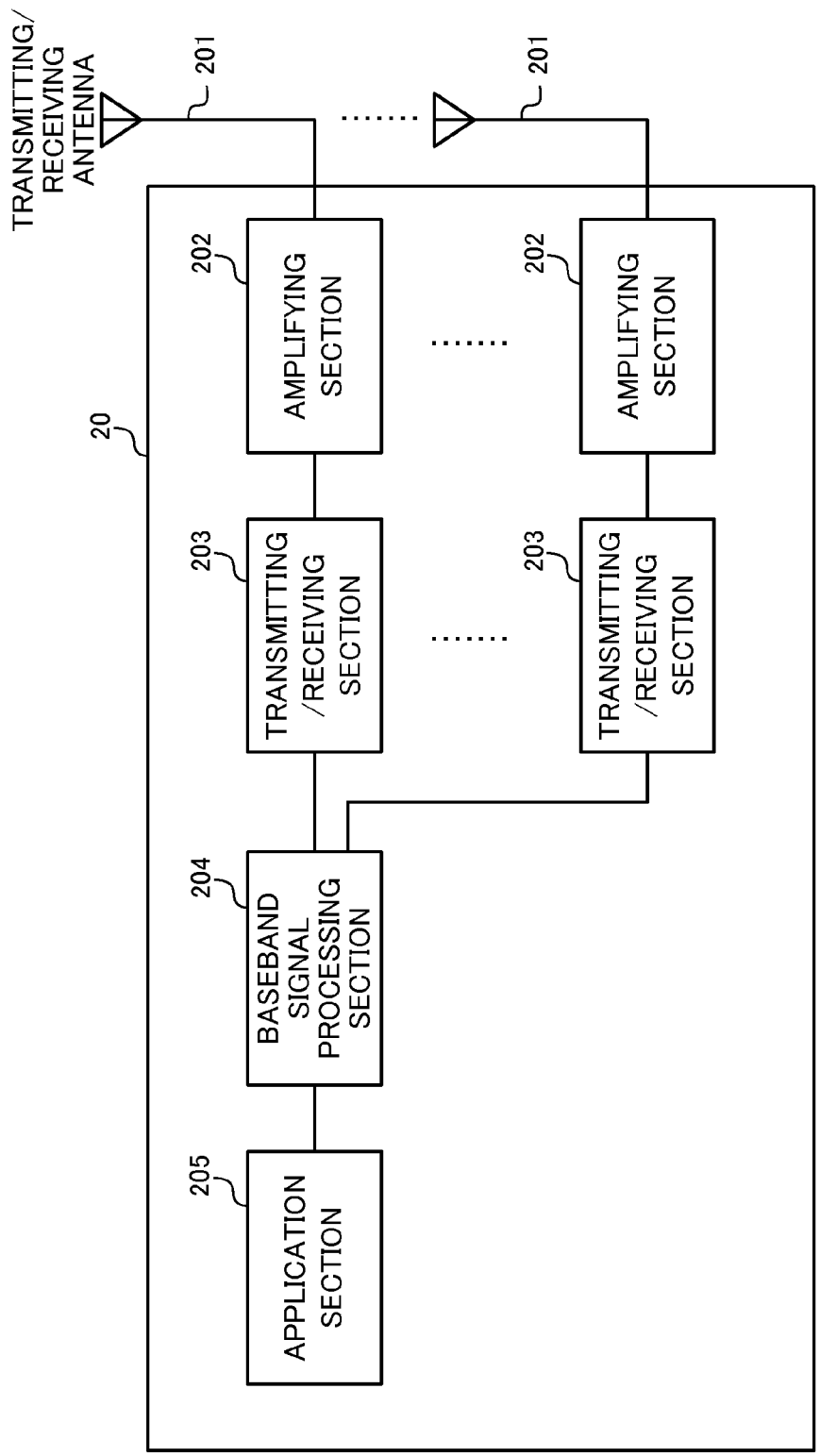
FIG. 16 is a diagram to explain an overall structure of a user terminal according to the present embodiment.

FIG. 16 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in the plurality of transmitting/receiving antennas 201 are each amplified in the amplifying sections 202, and subjected to frequency conversion and converted into baseband signals in the transmitting/receiving sections 203. These baseband signals are subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Figure 17:
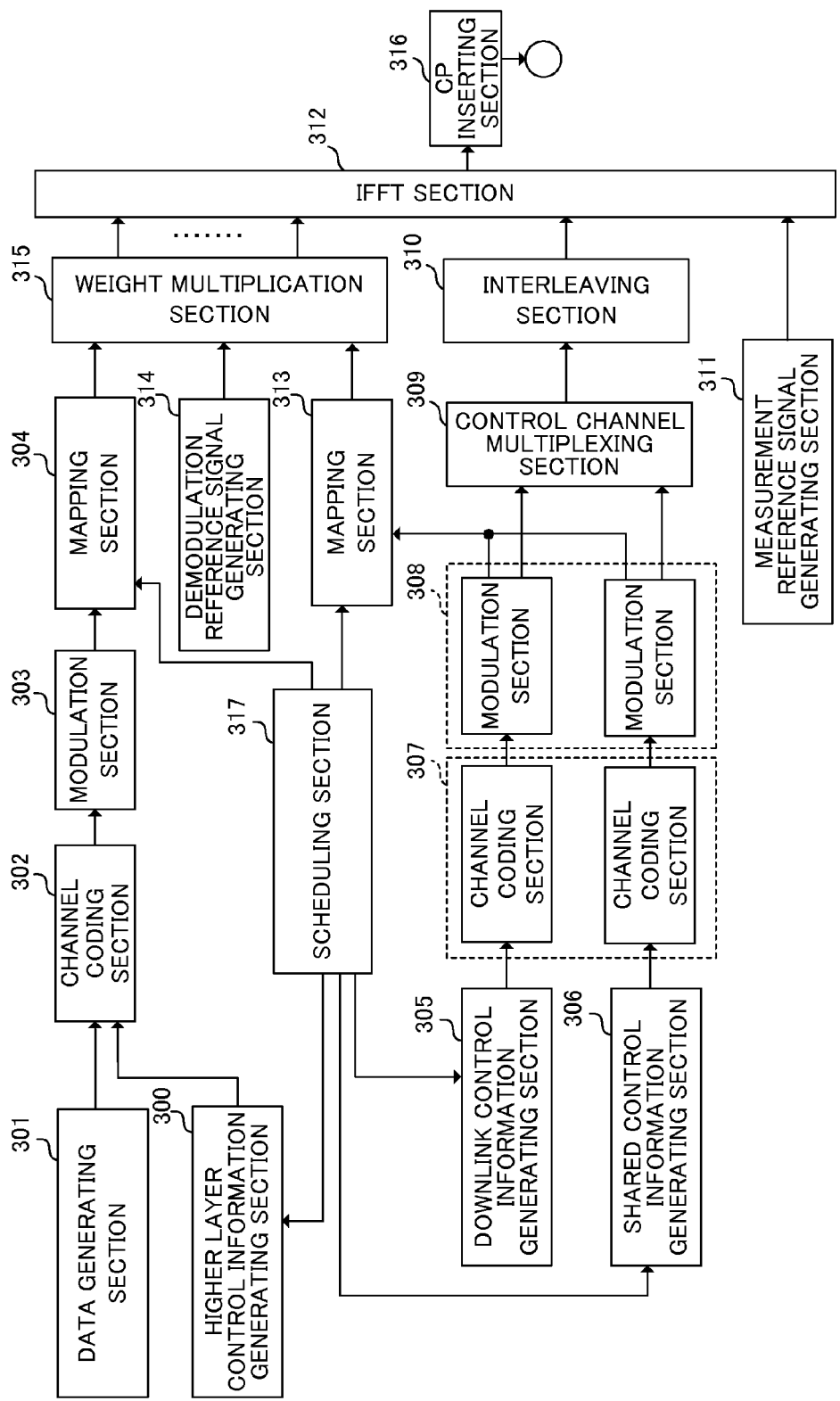
FIG. 17 is a function structure diagram of a baseband processing section of a radio base station according to the present embodiment, and part of higher layers.

FIG. 17 is a function structure diagram of the baseband signal processing section 104 provided in the radio base station 10 according to the present embodiment, and part of higher layers. Note that, although FIG. 17 primarily shows downlink (transmitting) functional configurations, the radio base station 10 may have uplink (receiving) functional configurations as well.

As shown in FIG. 17, the radio base station 10 has a higher layer control information generating section 300, a data generating section 301, a channel coding section 302, a modulation section 303, a mapping section 304, a downlink control information generating section 305, a shared control information generating section 306, channel coding sections 307, modulation sections 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316, and a scheduling section 317. Note that, when the radio base station 10 is a radio base station 12 to form a small cell C2, the control channel multiplexing section 309 and the interleaving section 310 may be omitted.

The higher layer control information generating section 300 generates higher layer control information on a per user terminal 20 basis. Also, the higher layer control information is control information that is sent through higher layer signaling (for example, RRC signaling) and includes, for example, enhanced PDCCH allocation information. Here, the enhanced PDCCH allocation information refers to, for example, the PRB pairs (resource blocks) that constitute each enhanced PDCCH set configured for the user terminal 20.

The data generating section 301 generates downlink user data per user terminal 20. The downlink user data that is generated in the data generating section 301 and the higher layer control information that is generated in the higher layer control information generating section 300 are input in the channel coding section 302 as downlink data to be transmitted in the PDSCH. The channel coding section 302 performs channel coding of the downlink data for each user terminal 20 in accordance with the coding rate determined based on feedback information from each user terminal 20. The modulation section 303 modulates the downlink data having been subjected to channel coding, in accordance with the modulation scheme determined based on feedback information from each user terminal 20. The mapping section 304 maps the modulated downlink data in accordance with commands from the scheduling section 317.

The downlink control information generating section 305 generates UE-specific downlink control information (DCI) on a per user terminal 20 basis. The UE-specific downlink control information includes PDSCH allocation information (DL grants), PUSCH allocation information (UL grants) and so on. The shared control information generating section 306 generates shared (cell-specific) control information that is shared between cells.

The downlink control information generated in the downlink control information generating section 305 and the shared control information generated in the shared control information generating section 306 are input in the channel coding sections 307 as downlink control information to be transmitted in the PDCCH or the enhanced PDCCH. The channel coding sections 307 perform channel coding of the downlink control information received as input, in accordance with the coding rate designated by the scheduling section 317, which will be described later. The modulation sections 308 modulate the downlink control information after channel coding.

Here, the downlink control information to be transmitted in the PDCCH is input from the modulation sections 308 into the control channel multiplexing section 309 and multiplexed. The downlink control information that is multiplexed in the control channel multiplexing section 309 is interleaved in the interleaving section 310. The interleaved downlink control information is input in the IFFT section 312, with measurement reference signals (channel state information-reference signals (CSI-RSs), cell-specific reference signals (CRSs) and so on) generated in the measurement reference signal section 311.

Meanwhile, downlink control information that is transmitted in the enhanced PDCCH is input from the modulation sections 308 into the mapping section 313. The mapping section 313 maps the downlink control information in predetermined allocation units (for example, eCCEs or eREGs) in accordance with commands from the scheduling section 317, which will be described later. The mapping section 313 may map the downlink control information using distributed mapping in accordance with commands from the scheduling section 317, or map the downlink control information using localized mapping.

The mapped downlink control information is input in the weight multiplication section 315, with the downlink data to be transmitted in the PDSCH (that is, the downlink data mapped in the mapping section 314) and the demodulation reference signals (DM-RSs) generated in the demodulation reference signal generating section 314. The weight multiplication section 315 multiplies the downlink data to be transmitted by the PDCSH, the downlink control information to be transmitted by the enhanced PDCCH and the demodulation reference signals, by user terminal 20-specific precoding weights, and pre-codes them. The pre-coded transmission data is input in the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 allocates radio resources to the downlink user data, the downlink control information and so on, based on command information from the higher station apparatus 30 and feedback information from each user terminal 20 (for example, channel state information (CSI), which includes channel quality indicators (CQIs) and rank indicators (RIs) and so on).

With the present embodiment, the scheduling section 317 configures a plurality of enhanced PDCCH sets (resource sets) for each user terminal 20. Also, the scheduling section 317 determines the PRB pairs (resource block) to constitute each enhanced PDCCH set. Furthermore, the scheduling section 317 determines the enhanced PDCCH sets to use, based on the number of user terminals 20 and so on. The scheduling section 317 constitutes the configuring section of the present invention.

Also, with the present embodiment, the scheduling section 317 determines the ECCEs (enhanced control channel elements) to constitute each search space candidate in such a way that a plurality of search space candidates of each enhanced PDCCH set where localized mapping is applied are all placed in different PRB pairs (resource blocks). The scheduling section 317 constitutes the determining section of the present invention.

To be more specific, the scheduling section 317 may determine the ECCEs to constitute each search space candidate based on the total number of ECCEs ($N_{ECCE}$) in a plurality of PRB pairs constituting each enhanced PDCCH set where localized mapping is applied, and the number of search space candidates in each enhanced PDCCH set at each aggregation level ($M_{set}^{(L)}$). These ECCEs are specified by, for example, the index numbers shown in above equation 3.

Also, with the present embodiment, the scheduling section 317 selects, from a plurality of PRB pairs constituting an enhanced PDCCH set, the PRB pairs to be subject to localized mapping of DCI, based on channel quality information (for example, CQIs) fed back from the user terminal 20. The scheduling section 317 commands the mapping section 313 to map DCI in localized mapping to the ECCEs constituting the search spaces placed in the selected PRB pairs. The scheduling section 317 constitutes the selection section of the present invention.

Note that the scheduling section 317 may determine the ECCEs to constitute a plurality of search space candidates of an enhanced PDCCH set where distributed mapping is applied, by using above equation 1.

Also, the scheduling section 317 may determine the ECCEs to constitute a plurality of search space candidates of an enhanced PDCCH set where localized mapping is applied, by using above equation 4.

Also, when cross-carrier scheduling is applied to the user terminal 20, the scheduling section 317 may determine the ECCEs to constitute a plurality of search space candidates of an enhanced PDCCH set where localized mapping is applied, based on carrier indicators. To be more specific, the scheduling section 317 may determine the ECCEs using above equation 5.

Figure 18:
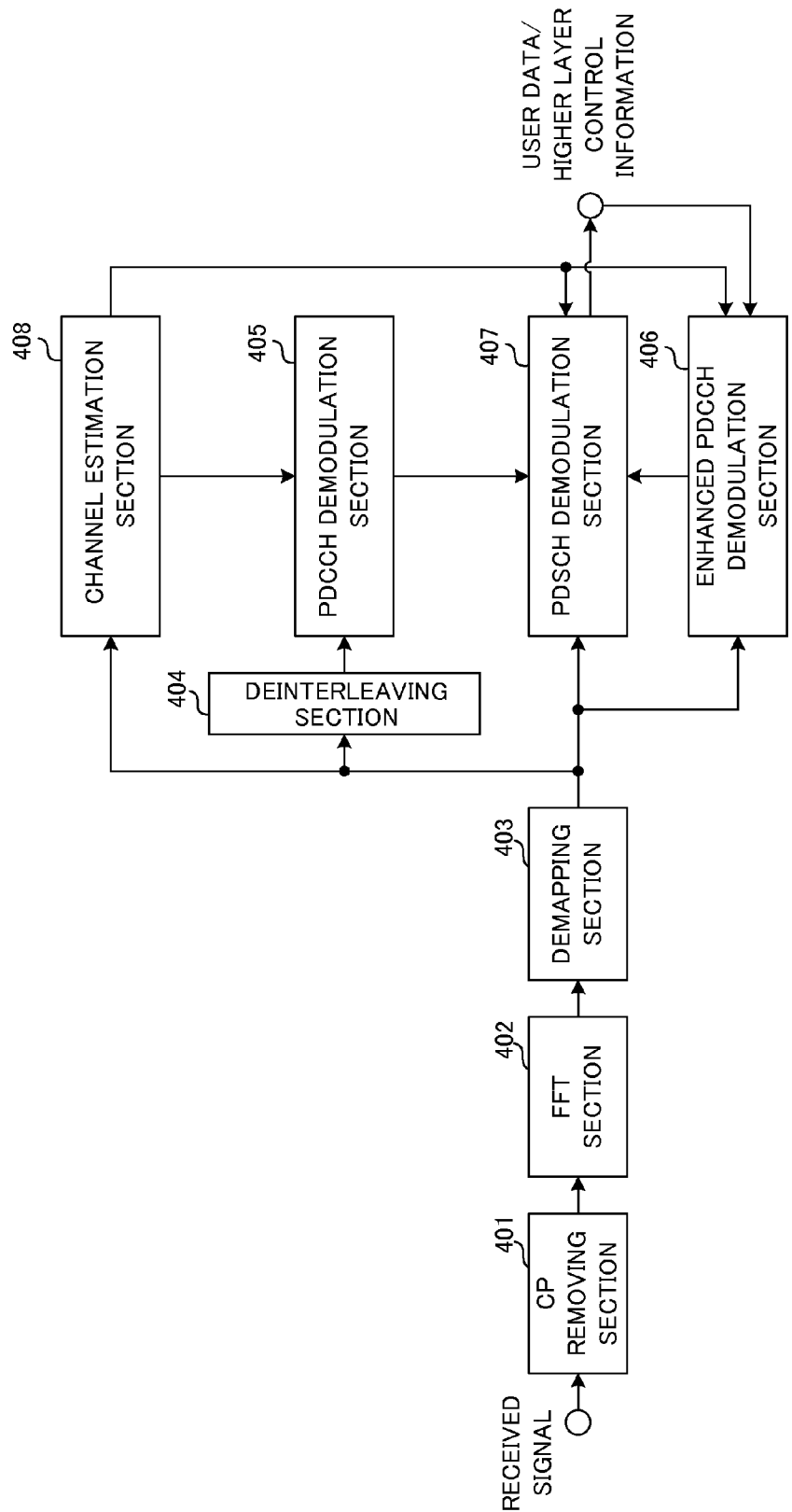
FIG. 18 is a function structure diagram of a baseband processing section of a user terminal according to the present embodiment.

FIG. 18 is a function structure diagram of the baseband signal processing section 204 provided in the user terminal 20. The user terminal 20 has, as downlink (receiving) functional configurations, a CP removing section 401, an FFT section 402, a demapping section 403, a deinterleaving section 404, a PDCCH demodulation section 405, an enhanced PDCCH demodulation section 406, a PDSCH demodulation section 407, and a channel estimation section 408.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts the time domain signals into frequency domain signals, and inputs these signals in the demapping section 403. The demapping section 403 demaps the downlink signals. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in a channel estimation section 408, which will be described later. To be more specific, the PDCCH demodulation section 405 blind-decodes the search space candidates reported from the radio base station 10 in advance or search space candidates that are determined in advance, and acquires the downlink control information. The PDCCH demodulation section 405 outputs the PDSCH allocation information included in the DCI to the PDSCH demodulation section 407.

The enhanced PDCCH demodulation section 406 performs blind decoding, demodulation, channel decoding and so on of the downlink control information (DCI) output from the demapping section 403, based on the result of channel estimation in the channel estimation section 409, which will be described later.

With the present embodiment, the enhanced PDCCH demodulation section 406 detects the PRB pairs to constitute each enhanced PDCCH set, based on enhanced PDCCH allocation information input from the PDSCH demodulation section 407.

Also, with the present embodiment, the enhanced PDCCH demodulation section 406 determines the ECCEs (enhanced control channel elements) to constitute each of a plurality of search space candidates, all placed in different PRB pairs (resource blocks) constituting each enhanced PDCCH set (resource sets).

To be more specific, the enhanced PDCCH demodulation section 406 may determine the ECCEs to constitute each search space candidate, based on the total number of ECCEs ($N_{ECCE}$) in a plurality of PRB pairs constituting each enhanced PDCCH set where localized mapping is applied, and the number of search space candidates in each enhanced PDCCH set at each aggregation level ($M_{set}^{(L)}$). These ECCEs are specified by, for example, the index numbers shown in above equation 3.

The enhanced PDCCH demodulation section 406 blind-decodes the ECCEs determined as described above, and acquires the DCI. The enhanced PDCCH demodulation section 406 outputs the PDSCH allocation information included in the DCI to the PDSCH demodulation section 407. The enhanced PDCCH demodulation section 406 constitutes the determining section and the acquisition section of the present invention.

Note that the enhanced PDCCH demodulation section 406 may determine the ECCEs to constitute a plurality of search space candidates of an enhanced PDCCH set where localized mapping is applied, using above equation 4.

Also, when cross-carrier scheduling is applied to the user terminal 20, the enhanced PDCCH demodulation section 406 may determine the ECCEs to constitute a plurality of search space candidates of the enhanced PDCCH set of each CC, based on carrier indicators. To be more specific, the enhanced PDCCH demodulation section 406 may determine the ECCEs using above equation 5.

The PDSCH demodulation section 406 performs demodulation and channel decoding and so on of the downlink data output from the demapping section 403, based on the result of channel estimation in the channel estimation section 408, which will be described later. To be more specific, the PDSCH demodulation section 407 demodulates the PDSCH allocated to the subject user terminal based on the downlink control information demodulated in the PDCCH demodulation section 405 or the enhanced PDCCH demodulation section 406, and acquires the downlink data (downlink user data and higher layer control information) for the subject user terminal.

The channel estimation section 408 performs channel estimation using demodulation reference signals (DM-RSs), measurement reference signals (CRSs and CSI-RSs) and so on. The channel estimation section 408 outputs the result of channel estimation by the measurement reference signals (CRSs and CSI-RSs) to the PDCCH demodulation section 405. Meanwhile, the channel estimation section 408 outputs the result of channel estimation by the demodulation reference signals (DM-RSs) to the PDSCH demodulation section 406 and to the enhanced PDCCH demodulation section 407. By means of this demodulation using user terminal 20-specific demodulation reference signals (DM-RSs), it is possible to achieve beam-forming gain with respect to the PDSCH and the enhanced PDCCH. In one or more embodiments of the invention, the aforementioned sections of the radio base station and the user terminal may be implemented in a special-purpose processor.

As has been described above, with the radio communication system 1 according to the present embodiment, the radio base station 10 determines the ECCEs to constitute each search space candidate, by using, for example, equation 3, such that a plurality of search space candidates of each enhanced PDCCH set are all placed in different resource blocks. By this means, a plurality of search space candidates of each enhanced PDCCH set are all placed in different resource blocks. Consequently, even when the number of enhanced PDCCH sets that are configured for each user terminal 10 is smaller than the number of search space candidates as of when no enhanced PDCCH set is provided, it is still possible to achieve frequency scheduling gain by localized mapping of DCI. Also, with equation 3, the parameter $Y_k$, which varies on a subframe basis, is taken into account, so that it is possible to reduce the probability of blocking.

Note that, when equation 4 is used instead of equation 3, it is possible to place a plurality of search space candidates of each enhanced PDCCH set all in different resource blocks.

Also, as shown in equation 5, by determining the ECCEs to constitute each search space candidate of each CC based on the carrier indicator $n_{CIF}$ of each CC, it is possible to place a plurality of search space candidates of each enhanced PDCCH set all in different PRB pairs even when cross-carrier scheduling is applied is applied to the enhanced PDCCHs.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosures of Japanese Patent Application No. 2012-216731, filed on Sep. 28, 2012, Japanese Patent Application No. 2012-243093, filed on Nov. 2, 2012, and Japanese Patent Application No. 2012-255503, filed on Nov. 21, 2012, including the specifications, drawings, and abstracts are incorporated herein by reference in their entirety.

The invention claimed is:

1. A radio base station that transmits downlink control information for a user terminal by using an enhanced downlink control channel that is frequency-division-multiplexed with a downlink shared data channel, the radio base station comprising:
a processor that configures one or more resource sets for the user terminal, each of the resource sets including one or more resource blocks allocated to the enhanced downlink control channel and
that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and
a transmitter that transmits information indicating the resource blocks included in each of the resource sets, wherein
the enhanced control channel elements are specified by index numbers that are assigned on a per resource set basis and that are represented by a hash function, and
the hash function is represented by the following equation:

$$L\left\{\left(Y_k + \left\lfloor m\frac{N_{ECCE}}{L \cdot M_{set}^{(L)}}\right\rfloor\right) \bmod \lfloor N_{ECCE}/L\rfloor\right\} + i$$

where:
$N_{ECCE}$ is the total number of the enhanced control channel elements;
$M_{set}^{(L)}$ is the number of search space candidates at each aggregation level;
L is an aggregation level of the enhanced control channel elements;
m=0, . . . , $M_{set}^{(L)}$−1;
i=0, . . . , L−1; and
$Y_k$ is a predetermined parameter that varies per subframe.

2. The radio base station according to claim 1, wherein
the processor selects a resource block from the resource blocks based on channel quality information from the user terminal, and
maps the downlink control information to at least one of the enhanced channel elements constituting a search space candidate that is placed in the selected resource block.

3. A user terminal that receives downlink control information from a radio base station by using an enhanced downlink control channel that is frequency-division-multiplexed with a downlink shared data channel, the user terminal comprising:
a receiver that, when the user terminal is configured with one or more resource sets including one or more resource blocks allocated to the enhanced downlink control channel, receives information indicating the resource blocks included in each of the resource sets; and
a processor that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets, wherein
the enhanced control channel elements are specified by index numbers that are assigned on a per resource set basis and that are represented by a hash function, and
the hash function is represented by the following equation:

$$L\left\{\left(Y_k + \left\lfloor m\frac{N_{ECCE}}{L \cdot M_{set}^{(L)}}\right\rfloor\right) \bmod \lfloor N_{ECCE}/L\rfloor\right\} + i$$

where:
$N_{ECCE}$ is the total number of the enhanced control channel elements;
$M_{set}^{(L)}$ is the number of search space candidates at each aggregation level;
L is an aggregation level of the enhanced control channel elements;
m=0, . . . , $M_{set}^{(L)}$−1;
i=0, . . . , L−1; and
$Y_k$ is a predetermined parameter that varies per subframe.

4. A radio communication system in which a radio base station transmits downlink control information for a user terminal by using an enhanced downlink control channel that is frequency-division-multiplexed with a downlink shared data channel, wherein:
the radio base station comprises:
a processor that configures one or more resource sets for the user terminal, each of the resource sets including one or more resource blocks allocated to the enhanced downlink control channel and
that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and
a transmitter that transmits information indicating the resource blocks included in each of the resource sets, wherein
the enhanced control channel elements are specified by index numbers that are assigned on a per resource set basis and that are represented by a hash function, and
the hash function is represented by the following equation:

$$L\left\{\left(Y_k + \left\lfloor m\frac{N_{ECCE}}{L \cdot M_{set}^{(L)}}\right\rfloor\right) \bmod \lfloor N_{ECCE}/L\rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, . . . , $M_{set}^{(L)}$−1;

i=0, . . . , L−1; and $Y_k$ is a predetermined parameter that varies per subframe.

5. A radio communication method in which a radio base station transmits downlink control information for a user terminal by using an enhanced downlink control channel that is frequency-division-multiplexed with a downlink shared data channel, the radio communication method comprising the steps of:

the radio base station:

configuring one or more resource sets for the user terminal, each of the resource sets including one or more resource blocks allocated to the enhanced downlink control channel and determining enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and transmitting information indicating the resource blocks included in each of the resource sets, wherein the enhanced control channel elements are specified by index numbers that are assigned on a per resource set basis and that are represented by a hash function, and the hash function is represented by the following equation:

$$L\left\{\left(Y_k + \left\lfloor m\frac{N_{ECCE}}{L \cdot M_{set}^{(L)}} \right\rfloor\right) \mod \lfloor N_{ECCE}/L \rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, . . . , $M_{set}^{(L)}$−1;

i=0, . . . , L−1; and $Y_k$ is a predetermined parameter that varies per subframe.

6. The user terminal according to claim 3, further comprising an acquisition section that blind-decodes the enhanced control channel elements to acquire the downlink control information.

7. A radio base station that transmits downlink control information for a user terminal by using an enhanced downlink control channel that is frequency-division-multiplexed with a downlink shared data channel, the radio base station comprising:

a processor that configures one or more resource sets for the user terminal, each of the resource sets including one or more resource blocks allocated to the enhanced downlink control channel and that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and a transmitter that transmits information indicating the resource blocks included in each of the resource sets, wherein the enhanced control channel elements are specified by index numbers that are assigned on a per resource set basis and that are represented by a hash function, when cross-carrier scheduling is applied to the user terminal, the enhanced control channel elements are specified by a carrier indicator, and the hash function is represented by the following equation:

$$L\left\{\left(Y_k + \left\lfloor m\frac{N_{ECCE}}{L \cdot M_{set}^{(L)}} \right\rfloor + n_{CIF}\right) \mod \lfloor N_{ECCE}/L \rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, . . . , $M_{set}^{(L)}$−1;

i=0, . . . , L−1;

$Y_k$ is a predetermined parameter that varies per subframe; and $n_{CIF}$ is a carrier indicator.

8. A user terminal that receives downlink control information from a radio base station by using an enhanced downlink control channel that is frequency-division-multiplexed with a downlink shared data channel, the user terminal comprising:

a receiver that, when the user terminal is configured with one or more resource sets including one or more resource blocks allocated to the enhanced downlink control channel, receives information indicating the resource blocks included in each of the resource sets; and a processor that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets, wherein the enhanced control channel elements are specified by index numbers that are assigned on a per resource set basis and that are represented by a hash function, when cross-carrier scheduling is applied to the user terminal, the enhanced control channel elements are specified by a carrier indicator, and the hash function is represented by the following equation:

$$L\left\{\left(Y_k + \left\lfloor m\frac{N_{ECCE}}{L \cdot M_{set}^{(L)}} \right\rfloor + n_{CIF}\right) \mod \lfloor N_{ECCE}/L \rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, ..., $M_{set}^{(L)}$-1;

i=0, ..., L-1;

$Y_k$ is a predetermined parameter that varies per subframe; and $n_{CIF}$ is a carrier indicator.

9. A radio communication system in which a radio base station transmits downlink control information for a user terminal by using an enhanced downlink control channel that is frequency-division-multiplexed with a downlink shared data channel, wherein:

the radio base station comprises:

a processor that configures one or more resource sets for the user terminal, each of the resource sets including one or more resource blocks allocated to the enhanced downlink control channel and that determines enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and a transmitter that transmits information indicating the resource blocks included in each of the resource sets, wherein the enhanced control channel elements are specified by index numbers that are assigned on a per resource set basis and that are represented by a hash function, when cross-carrier scheduling is applied to the user terminal, the enhanced control channel elements are specified by a carrier indicator, and the hash function is represented by the following equation:

$$L\left\{\left(Y_k + \left\lfloor m\frac{N_{ECCE}}{L \cdot M_{set}^{(L)}}\right\rfloor + n_{CIF}\right) \mod \lfloor N_{ECCE}/L \rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, ..., $M_{set}^{(L)}$-1;

i=0, ..., L-1;

$Y_k$ is a predetermined parameter that varies per subframe; and $n_{CIF}$ is a carrier indicator.

10. A radio communication method in which a radio base station transmits downlink control information for a user terminal by using an enhanced downlink control channel that is frequency-division-multiplexed with a downlink shared data channel, the radio communication method comprising the steps of:

the radio base station:

configuring one or more resource sets for the user terminal, each of the resource sets including one or more resource blocks allocated to the enhanced downlink control channel and determining enhanced control channel elements to constitute a plurality of search space candidates of each of the resource sets based on a total number of enhanced control channel elements in the resource blocks constituting each of the resource sets, and a number of search space candidates at each aggregation level in each of the resource sets; and transmitting information indicating the resource blocks included in each of the resource sets, wherein the enhanced control channel elements are specified by index numbers that are assigned on a per resource set basis and that are represented by a hash function, when cross-carrier scheduling is applied to the user terminal, the enhanced control channel elements are specified by a carrier indicator, and the hash function is represented by the following equation:

$$L\left\{\left(Y_k + \left\lfloor m\frac{N_{ECCE}}{L \cdot M_{set}^{(L)}}\right\rfloor + n_{CIF}\right) \mod \lfloor N_{ECCE}/L \rfloor\right\} + i$$

where:

$N_{ECCE}$ is the total number of the enhanced control channel elements;

$M_{set}^{(L)}$ is the number of search space candidates at each aggregation level;

L is an aggregation level of the enhanced control channel elements;

m=0, ..., $M_{set}^{(L)}$-1;

i=0, ..., L-1;

$Y_k$ is a predetermined parameter that varies per subframe; and $n_{CIF}$ is a carrier indicator.

* * * * *